US008656374B2

(12) United States Patent
Belyy et al.

(10) Patent No.: US 8,656,374 B2
(45) Date of Patent: Feb. 18, 2014

(54) PROCESSING COBOL DATA RECORD SCHEMAS HAVING DISPARATE FORMATS

(75) Inventors: Andrey Belyy, Sunnyvale, CA (US); Alexander Ocher, San Jose, CA (US)

(73) Assignee: Business Objects Software Ltd., Dublin (IE)

( * ) Notice: Subject to any disclaimer, the term of this patent is extended or adjusted under 35 U.S.C. 154(b) by 1934 days.

(21) Appl. No.: 11/455,035

(22) Filed: Jun. 16, 2006

(65) Prior Publication Data

US 2007/0294677 A1  Dec. 20, 2007

(51) Int. Cl.
G06F 9/45 (2006.01)
G06F 7/00 (2006.01)
G06F 17/21 (2006.01)
G06F 9/44 (2006.01)

(52) U.S. Cl.
USPC ........... 717/143; 707/601; 707/602; 715/234; 715/235; 717/114; 717/136

(58) Field of Classification Search
None
See application file for complete search history.

(56) References Cited

U.S. PATENT DOCUMENTS

| | | | |
|---|---|---|---|
| 4,567,574 A | | 1/1986 | Saade et al. |
| 5,230,049 A | * | 7/1993 | Chang et al. ............... 717/143 |
| 5,428,792 A | * | 6/1995 | Conner et al. ............... 717/143 |
| 5,432,930 A | | 7/1995 | Song |
| 5,640,550 A | | 6/1997 | Coker |
| 5,742,827 A | * | 4/1998 | Ohkubo et al. ............... 717/143 |
| 5,778,232 A | | 7/1998 | Caldwell et al. |
| 5,826,076 A | | 10/1998 | Bradley et al. |
| 5,838,965 A | * | 11/1998 | Kavanagh et al. ............... 1/1 |
| 5,878,422 A | * | 3/1999 | Roth et al. ............... 1/1 |
| 6,209,124 B1 | * | 3/2001 | Vermeire et al. ............... 717/114 |
| 6,237,140 B1 | * | 5/2001 | Carter et al. ............... 717/143 |
| 6,356,285 B1 | * | 3/2002 | Burkwald et al. ............ 715/853 |
| 6,453,464 B1 | | 9/2002 | Sullivan |
| 6,523,172 B1 | * | 2/2003 | Martinez-Guerra et al. . 717/143 |
| 6,687,873 B1 | * | 2/2004 | Ballantyne et al. ........... 715/215 |
| 6,704,747 B1 | | 3/2004 | Fong |
| 6,775,680 B2 | | 8/2004 | Ehrman et al. |
| 6,782,540 B1 | * | 8/2004 | Chow et al. ............... 719/316 |
| 6,820,135 B1 | | 11/2004 | Dingman et al. |
| 6,836,777 B2 | | 12/2004 | Holle |
| 6,901,403 B1 | | 5/2005 | Bata et al. |
| 6,904,598 B2 | | 6/2005 | Abileah et al. |
| 6,920,461 B2 | | 7/2005 | Hejlsberg et al. |

(Continued)

FOREIGN PATENT DOCUMENTS

EP   753819 A1 *  1/1997  ............ G06F 17/30

OTHER PUBLICATIONS

Intel Endianness White Paper, published by Intel, Nov. 15, 2004, pp. 1-22.*

(Continued)

*Primary Examiner* — Thuy Dao
*Assistant Examiner* — Zheng Wei
(74) *Attorney, Agent, or Firm* — Mintz, Levin, Cohn, Ferris, Glovsky and Popeo, P.C.

(57) ABSTRACT

A computer readable medium is configured to receive a description of a COBOL copybook that can be represented in one of a plurality of disparate formats, to parse the COBOL copybook based on the description of the COBOL copybook, and to create a standardized data record schema based on the COBOL copybook. The description of the COBOL copybook includes information about the format of the COBOL copybook.

27 Claims, 21 Drawing Sheets

(56) References Cited

U.S. PATENT DOCUMENTS

| | | | |
|---|---|---|---|
| 6,959,300 B1 | 10/2005 | Caldwell et al. | |
| 6,961,721 B2 | 11/2005 | Chaudhuri et al. | |
| 6,980,995 B2* | 12/2005 | Charlet et al. | 1/1 |
| 7,016,906 B1 | 3/2006 | Janzig et al. | |
| 7,020,661 B1 | 3/2006 | Cruanes et al. | |
| 7,111,284 B2* | 9/2006 | Takagi et al. | 717/136 |
| 7,194,479 B1* | 3/2007 | Packham | 717/124 |
| 7,472,137 B2* | 12/2008 | Edelstein et al. | 1/1 |
| 7,584,422 B2* | 9/2009 | Ben-Yehuda et al. | 715/236 |
| 7,640,261 B2* | 12/2009 | Belyy et al. | 1/1 |
| 7,681,118 B1* | 3/2010 | Dasari et al. | 715/234 |
| 7,707,561 B2* | 4/2010 | Vera | 717/136 |
| 7,730,011 B1* | 6/2010 | Deninger et al. | 707/602 |
| 7,730,471 B2* | 6/2010 | Cauvin et al. | 717/153 |
| 7,761,406 B2* | 7/2010 | Harken | 707/602 |
| 7,970,729 B2* | 6/2011 | Cozzi | 707/601 |
| 8,121,976 B2* | 2/2012 | Kalia et al. | 707/601 |
| 8,255,794 B2* | 8/2012 | Dasari et al. | 715/234 |
| 8,548,938 B2* | 10/2013 | Amaru et al. | 707/603 |
| 2001/0018684 A1* | 8/2001 | Mild et al. | 707/1 |
| 2001/0025372 A1* | 9/2001 | Vermeire et al. | 717/7 |
| 2001/0047365 A1 | 11/2001 | Yonaitis | |
| 2001/0047372 A1* | 11/2001 | Gorelik et al. | 707/514 |
| 2002/0038335 A1 | 3/2002 | Dong et al. | |
| 2002/0038336 A1 | 3/2002 | Abileah et al. | |
| 2002/0042849 A1 | 4/2002 | Ho et al. | |
| 2002/0046294 A1 | 4/2002 | Brodsky et al. | |
| 2002/0056012 A1* | 5/2002 | Abileah et al. | 709/310 |
| 2003/0005410 A1* | 1/2003 | Harless | 717/114 |
| 2003/0018660 A1* | 1/2003 | Martin et al. | 707/500 |
| 2003/0033317 A1 | 2/2003 | Ziglin | |
| 2003/0131109 A1* | 7/2003 | Rosensteel et al. | 709/227 |
| 2003/0163585 A1* | 8/2003 | Elderon et al. | 709/246 |
| 2004/0006739 A1* | 1/2004 | Mulligan | 715/513 |
| 2004/0044678 A1* | 3/2004 | Kalia et al. | 707/102 |
| 2004/0073565 A1 | 4/2004 | Kaufman et al. | |
| 2004/0111464 A1 | 6/2004 | Ho et al. | |
| 2004/0221292 A1 | 11/2004 | Chiang et al. | |
| 2005/0038629 A1* | 2/2005 | Amaru et al. | 702/179 |
| 2005/0097118 A1 | 5/2005 | Slutz | |
| 2005/0097537 A1 | 5/2005 | Laura | |
| 2005/0097538 A1 | 5/2005 | Laura | |
| 2005/0097539 A1 | 5/2005 | Laura | |
| 2005/0097564 A1 | 5/2005 | Laura | |
| 2005/0125730 A1* | 6/2005 | Goddard et al. | 715/531 |
| 2005/0192994 A1 | 9/2005 | Caldwell et al. | |
| 2005/0228808 A1 | 10/2005 | Mamou et al. | |
| 2005/0234889 A1* | 10/2005 | Fox et al. | 707/3 |
| 2005/0235274 A1* | 10/2005 | Mamou et al. | 717/136 |
| 2006/0031820 A1 | 2/2006 | Li | |
| 2006/0041862 A1 | 2/2006 | Moussallam et al. | |
| 2006/0064666 A1 | 3/2006 | Amaru et al. | |
| 2007/0055678 A1 | 3/2007 | Fung et al. | |
| 2007/0156737 A1* | 7/2007 | Barnes | 707/101 |
| 2007/0294267 A1* | 12/2007 | Belyy et al. | 707/100 |
| 2007/0294268 A1* | 12/2007 | Belyy et al. | |
| 2009/0222467 A1* | 9/2009 | Kalia et al. | 707/100 |
| 2010/0185937 A1* | 7/2010 | Dasari et al. | 715/234 |

OTHER PUBLICATIONS

Database Endian Conversion, published by InterSystems Corp., Sep. 15, 1999, pp. 1-3.*

Cobol Copybook Converter User's Guide, Release 5.0.3, published by SEEBEYOND, 2004, p. 1-28.*

Henrard et al., Strategies for Data Reengineering, published by IEEE Computer Society, Proceedings of the Ninth Working Conference on Reverse Engineering (WCRE'02), 2002, pp. 1-10.*

Merten et al., A Data Description Language Approach To File Translation, published in: SIGFIDET '74 Proceedings of the 1974 ACM SIGFIDET, 1974, pp. 191-205.*

* cited by examiner

FIG. 8

```xml
<?xml version="1.0" encoding="UTF-8" ?>
<!-- BusinessObjects Data Integrator generated XML -->
<!-- 2006-05-31.17:28:17(345,644)[1] -->
- <NestedO_out>
    <ORDERID>001</ORDERID>
    <DESCRIPTION>MSFTK</DESCRIPTION>
    <ITEMID_1>I21</ITEMID_1>
    <PRICE_1>$15.99</PRICE_1>
    <ITEMID_2>I78</ITEMID_2>
    <PRICE_2>$22.99</PRICE_2>
    <ITEMID_3>I89</ITEMID_3>
    <PRICE_3>$34.99</PRICE_3>
    <ORDERID>002</ORDERID>
    <DESCRIPTION>TLKIT</DESCRIPTION>
    <ITEMID_1>I55</ITEMID_1>
    <PRICE_1>$65.99</PRICE_1>
    <ITEMID_2>I99</ITEMID_2>
    <PRICE_2>$99.99</PRICE_2>
    <ITEMID_3>I77</ITEMID_3>
    <PRICE_3>$01.99</PRICE_3>
  </NestedO_out>
```

1000 (points to first ORDERID block)
1002 (points to second ORDERID block)

FIG. 10

```xml
<?xml version="1.0" encoding="UTF-8" ?>
<!-- BusinessObjects Data Integrator generated XML. -->
<!-- 2006-05-31.17:28:17(345,644)[1] -->
<NestedO_out>
    <ORDERID>001</ORDERID>
    <DESCRIPTION>MSFTK</DESCRIPTION>
    <ITEMID>I21</ITEMID>
    <PRICE>$15.99</PRICE>
    <ORDERID>001</ORDERID>
    <DESCRIPTION>MSFTK</DESCRIPTION>
    <ITEMID>I78</ITEMID>
    <PRICE>$22.99</PRICE>
    <ORDERID>001</ORDERID>
    <DESCRIPTION>MSFTK</DESCRIPTION>
    <ITEMID>I89</ITEMID>
    <PRICE>$34.99</PRICE>
    <ORDERID>002</ORDERID>
    <DESCRIPTION>TLKIT</DESCRIPTION>
    <ITEMID>I55</ITEMID>
    <PRICE>$65.99</PRICE>
    <ORDERID>002</ORDERID>
    <DESCRIPTION>TLKIT</DESCRIPTION>
    <ITEMID>I99</ITEMID>
    <PRICE>$99.99</PRICE>
    <ORDERID>002</ORDERID>
    <DESCRIPTION>TLKIT</DESCRIPTION>
    <ITEMID>I77</ITEMID>
    <PRICE>$01.99</PRICE>
</NestedO_out>
```

1100 (upper group) 1102 (lower group)

FIG. 11

PROCESSING COBOL DATA RECORD SCHEMAS HAVING DISPARATE FORMATS

CROSS REFERENCES TO RELATED APPLICATIONS

The present application is related to the following concurrently filed U.S. patent applications that are commonly owned and that have the same inventors: (1) U.S. patent application Ser. No. 11/454,224, entitled "Apparatus and Method for Processing of COBOL Nested Data Record Schemas," filed on Jun. 16, 2006, now abandoned; and (2) U.S. patent application Ser. No. 11/454,254, entitled "Apparatus and Method for Processing Data Corresponding to Multiple COBOL Data Record Schemas," filed on Jun. 16, 2006, issued as U.S. Pat. No. 7,640,261.

FIELD OF THE INVENTION

The present invention relates generally to data processing. More particularly, this invention relates to COBOL data integration and processing based on a standardized data record schema derived from a COBOL data record schema.

BACKGROUND OF THE INVENTION

The Common Business Oriented Language (COBOL) has been widely used in business computing since the 1960's. The advantages of COBOL include its maintainability and its portability across hardware platforms and operating systems. However, there is no adequate data processing system available that can flexibly process COBOL data files generated by COBOL applications sold by the many different COBOL application vendors. There are two major difficulties that have hindered the development of such a data processing system. First, the format of a COBOL data file is in part defined by the COBOL application that generated the COBOL data file. Conventional data processing systems typically need to be modified to handle data files generated by each new COBOL application based on knowledge of the COBOL data file format, which may require an understanding of the source code of the COBOL application. Second, even with an understanding of the COBOL application source code, additional understanding of the physical environment that generated the COBOL data file may be needed to read the file. For example, this understanding includes characteristics of the system generating the COBOL data files such as endianness, character encodings, and localizations. This adds further complications to the modification of conventional data processing systems to read COBOL data files.

There are other challenges in the processing of COBOL data files. COBOL data files sometimes contain interspersed data of different types, such as employee data and customer data, where each type of data is defined by a distinct COBOL data record schema within COBOL application source code. Conventional data processing systems typically cannot process such data files, since those systems assume that all data within such data files is of the same type. COBOL data files also sometimes contain nested data. Conventional data processing systems often are not able to process nested data, and also do not place data read from such data files in a flat data structure that enables handling by modern database management systems.

To address these shortcomings, it would be desirable to provide a COBOL data processing system that handles COBOL data files created by multiple vendors. It would also be desirable for the COBOL data processing system to handle COBOL data files generated by unfamiliar COBOL applications created by unfamiliar vendors based on user input, without requiring modification of the COBOL data processing system itself. This solution may enable users unfamiliar with COBOL to process COBOL data files created by multiple vendors. It would also be desirable for this solution to be capable of extracting subsets of data from COBOL data files with interspersed data of different types based on definitions of these data types in multiple COBOL data record schemas. Finally, it would be desirable for this solution to read nested data in COBOL data files, and to store this nested data in a flattened form that enables handling by database management systems, such as in accordance with a nested COBOL data record schema corresponding to this nested data.

SUMMARY OF THE INVENTION

This invention includes a computer readable medium to direct a computer to function in a specified manner. In one embodiment, a computer-readable medium comprises instructions to receive a description of a COBOL copybook represented in one of a plurality of disparate formats, where the description of the COBOL copybook includes information about the disparate format of the COBOL copybook; to parse the COBOL copybook based on the description of the COBOL copybook; and to create a standardized data record schema based on the COBOL copybook. The computer-readable medium may further comprise instructions to receive a parameterized location of a data record corresponding to the COBOL copybook and information about the data record format, and to process the data record based on the standardized data record schema.

In another embodiment, the computer-readable medium comprises instructions to receive a description of a data record schema represented in one of a plurality of disparate formats, where the description of the data record schema includes information about the disparate format of the data record schema; to parse the data record schema based on the description of the data record schema; and to create a standardized data record schema based on the data record schema.

BRIEF DESCRIPTION OF THE DRAWINGS

For a better understanding of the nature and objects of the invention, reference should be made to the following detailed description taken in conjunction with the accompanying drawings, in which:

FIG. 8 illustrates a screen shot display of a textual representation of the standardized data record schema of FIG. 7, in accordance with one embodiment of the present invention;

FIG. 10 illustrates a screen shot display of the XML file of FIG. 9 linked to the expanded standardized data record schema of FIG. 5, in accordance with one embodiment of the present invention;

FIG. 11 illustrates a screen shot display of the XML file of FIG. 9 linked to the collapsed standardized data record schema of FIG. 7, in accordance with one embodiment of the present invention;

DETAILED DESCRIPTION OF THE INVENTION

Figure 1:
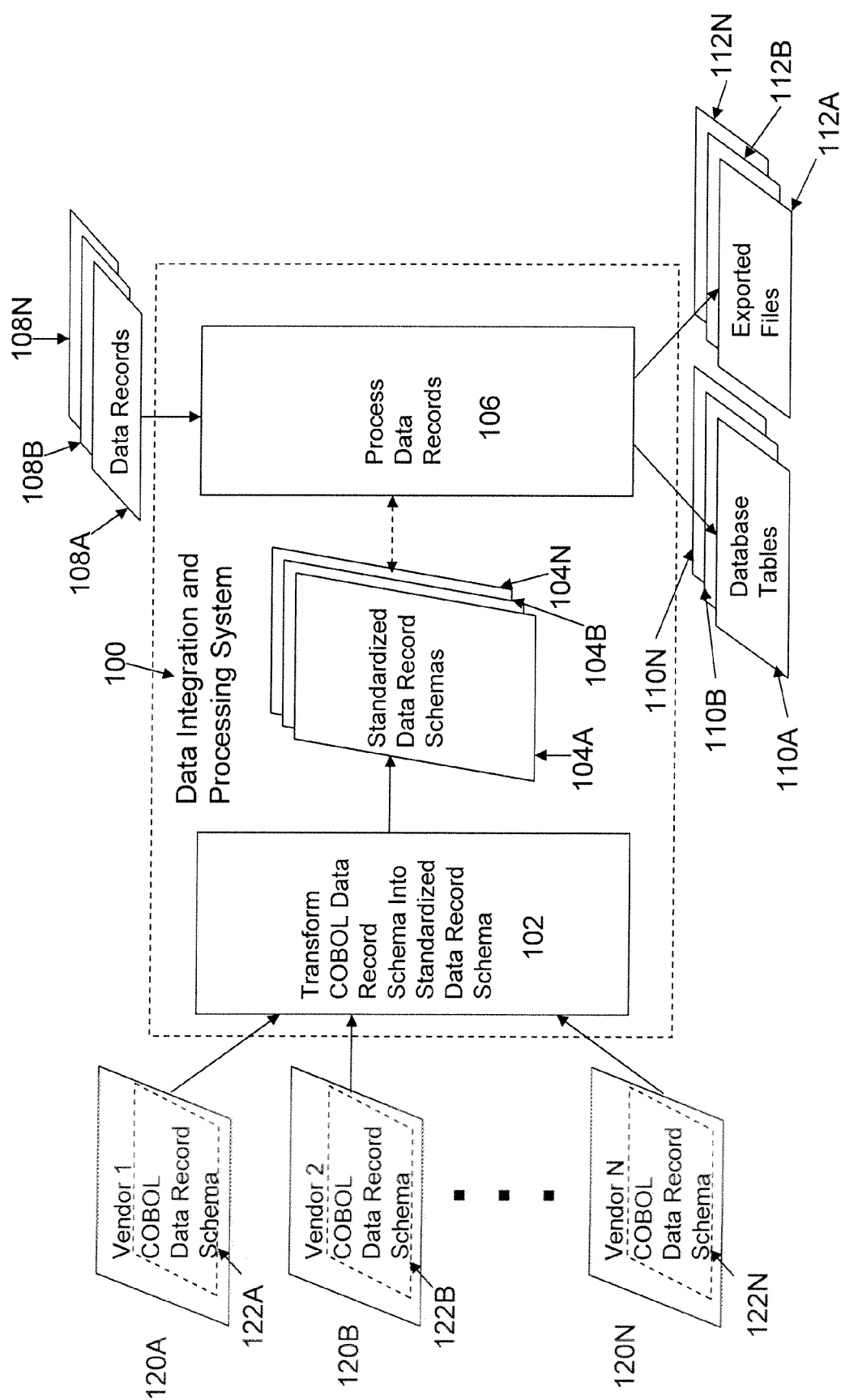
FIG. 1 illustrates a data integration and processing system that creates standardized data record schemas from COBOL data record schema descriptions and associated COBOL data record schemas, and that uses the standardized data record schemas to process data records, in accordance with one embodiment of the present invention.

FIG. 1 illustrates a data integration and processing system 100 that creates standardized data record schemas 104 from COBOL data record schema descriptions 120A-120N and associated COBOL data record schemas 122A-122N, and that uses the standardized data record schemas 104A-104N to process data records 108A-108N, in accordance with one embodiment of the present invention. The functions of the data integration and processing system 100 may be divided among one or more computing devices. The COBOL data record schema description 120 includes an identification of the COBOL data record schema 122, and may include but is not limited to information about the format of the COBOL data record schema 122. In this example, each COBOL data record schema 122 is a field-level definition in COBOL of the format of the corresponding data record 108 that includes, for example, field ordering and field size. More generally, the data records 108 processed by the data integration and processing system 100 may correspond to any subset of the COBOL data record schemas 122. The identification of the COBOL data record schema 122 may be in the form of a parameterized data path containing a filename, where the parameterized data path enables access to the COBOL data record schema 122. One or more COBOL data record schemas 122 may be contained in a COBOL copybook, which is a common piece of source code designed to be copied into many source programs. A COBOL copybook is most useful for copying file descriptions and record layouts into the Data Divisions of COBOL programs that access the same common set of files.

Though in this example the COBOL data record schema 122 defines the fields of the data record 108, additional information about the format of the COBOL data record schema 122 may be needed to read the COBOL data record schema 122. This format information may be provided by the user to the data integration and processing system 100, and may include characteristics that vary across computer architectures and/or applications, including but not limited to endianness, character encodings such as American Standard Code for Information Interchange (ASCII) and Extended Binary Coded Decimal Interchange Code (EBCDIC), and localizations. These characteristics may be computer system-specific, and may be application-specific. With the information in the COBOL data record schema description 120, the data integration and processing system 100 can process COBOL data record schemas 122 in disparate formats, and without users having knowledge of COBOL.

The data integration and processing system 100 applies the information in the COBOL data record schema descriptions 120 to the COBOL data record schemas 122 to transform (block 102) the COBOL data record schemas 122 into standardized data record schemas 104. The standardized data record schema 104 is a representation of the COBOL data record schema 122 that can be commonly processed and used for processing by the data integration and processing system 100. The creation of the standardized data record schema 104 may be achieved by converting variations in data record schema format and localizations across the COBOL data record schemas 122 into a common syntax and/or encoding substantially independent of those variations. The standardized data record schema 104 may be written in a human-readable form, such as in a script language such as Advanced Transformation Language (ATL). The standardized data record schema 104 may also contain format information that varies across systems running COBOL applications for COBOL data files containing one or more data records 108. This format information may include but is not limited to endianness, character encodings, localizations, record format (such as fixed length or variable length), whether variable length records contain record length information, and record length for fixed length records. This format information may be system-specific, may be application-specific, and may also be a user input.

The standardized data record schemas 104 are then used by the data integration and processing system to process (block 106) data records 108. The use of standardized data record schemas 104 that may contain format information may enable the data integration and processing system 100 to process data records 108 generated by unfamiliar COBOL applications created by unfamiliar vendors based on user input, without requiring modification of the data integration and processing system 100 itself. Format information for COBOL data files containing one or more data records 108 may be provided as a separate input to block 106 if that information is not already included in the standardized data record schemas 104. As part of processing (block 106) data records 108, an association may be made between a particular standardized data record schema 104N and a data record 108N, so that processing (block 106) applies that particular standardized data schema 104N to the data record 108N. The result of block 106 may include, but is not limited to, one or more database tables 110A-110N containing at least some portion of the contents of the data record 108, and one or more exported files 112A-112N in a format such as Extensible Markup Language (XML) and containing at least some portion of the contents of the data record 108. The database tables 110 based on data records 108 may also be jointly processed using a data manipulation language that may take the form of joins and queries in the Structured Query Language (SQL).

The standardized data record schema 104 is also a flat data structure that enables handling by modern database management systems. Database management systems do not allow database table fields to be nested within other fields. A COBOL data record schema 122A (see FIG. 4A) that is nested, such as through use of the "OCCURS" clause, is flattened as part of its conversion to the standardized data record schema 104A (see FIG. 5), so that no fields are nested within other fields. This flattening may be done in various ways, each resulting in a distinct standardized data record schema 104A.

The data integration and processing system 100 also may handle COBOL copybooks containing more than one COBOL data record schema 122, and may be capable of extracting subsets of data from COBOL data files with interspersed data records 108 of different types. Each of multiple COBOL data record schemas 122 contained in a COBOL copybook is transformed into a corresponding standardized data record schema 104. As part of processing (block 106), a particular standardized data record schema 104N may be designated as a selected standardized data record schema for use in processing a COBOL data file containing data records 108 of multiple distinct types, where each type corresponds to an individual standardized data record schema 104. The result of block 106 may then include, but is not limited to, a database table 110 containing at least some portion of the contents of the data records 108 of the type corresponding to the selected standardized data record schema 104N, and an exported file 112 in a format such as Extensible Markup Language (XML) and containing at least some portion of the contents of the data records 108 of the type corresponding to the selected standardized data record schema 104N.

Figure 2:
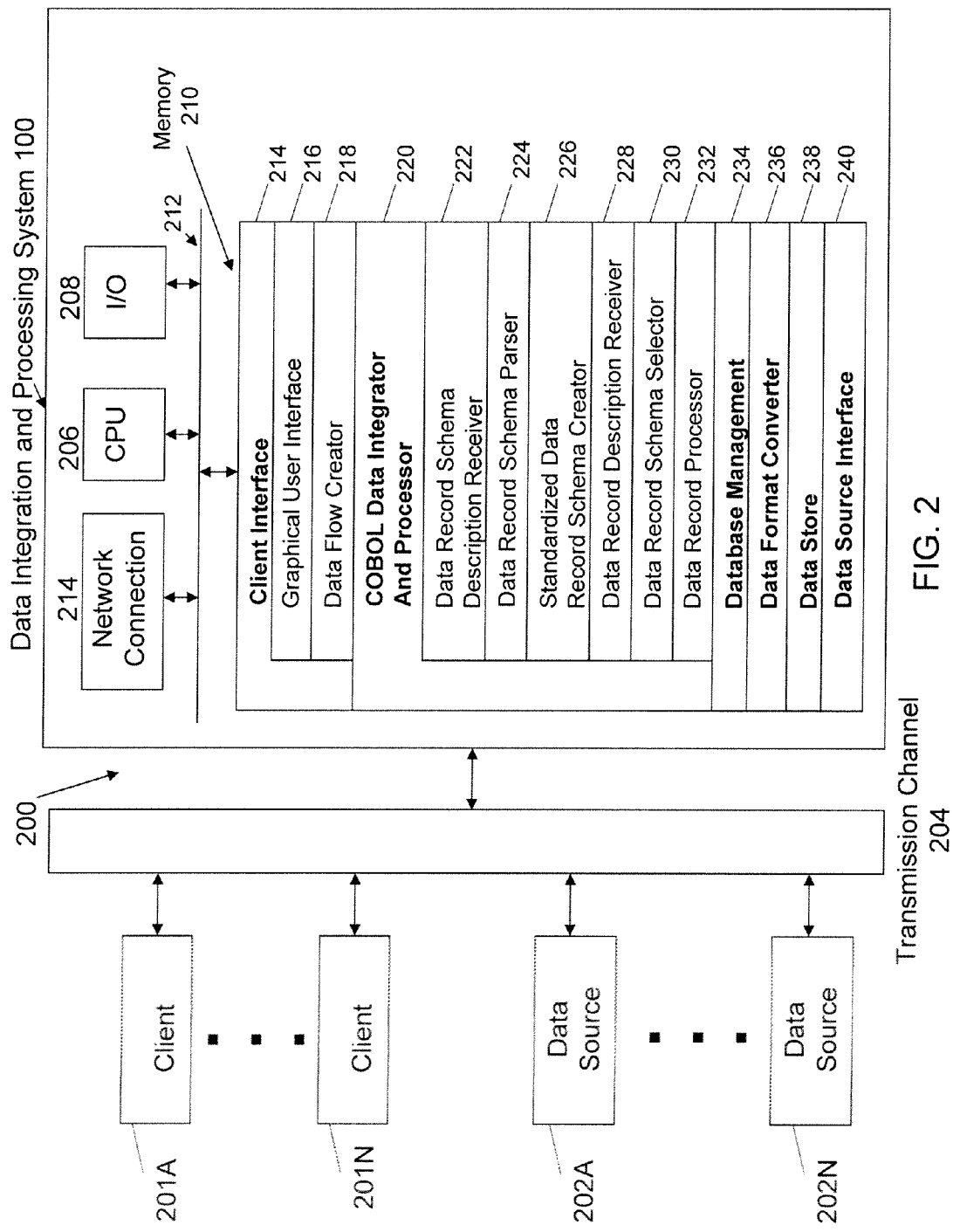
FIG. 2 illustrates the data integration and processing system of FIG. 1 including a COBOL data integrator and processor, which is configured in accordance with one embodiment of the present invention.

FIG. 2 illustrates the data integration and processing system 100 of FIG. 1 including a COBOL data integrator and processor 220, which is configured in accordance with one embodiment of the present invention. A network 200 includes the data integration and processing system 100, which may communicate via a transmission channel 204 with a set of clients 201A-201N and a set of data sources 202A-202N. The client 201 may be a computer, and may be a human interacting with the data integration and processing system 100 via a user interface such as a keyboard. The data source 202 may be a computer containing a computer-accessible data store including but not limited to a database and a file.

The data integration and processing system 100 may reside on the same computer with one or more clients 201 and one or more data sources 202, or may reside on a separate computer. The data integration and processing system 100 includes standard components, such as a network connection 214, a CPU 206, and an input/output module 208, which communicate over a bus 212. A memory 210 is also connected to the bus 212. The memory 210 stores a set of executable programs that are used to implement the functions of the invention. The clients 201 and the data sources 202 may include the same standard components.

In an embodiment of the invention, the memory 210 stores executable instructions establishing a client interface module 214, the COBOL data integrator and processor 220, a database management module 234, a data format converter 236, a data store 238, and a data source interface module 240. The client interface module 214 has modules including a graphical user interface 216 and a data flow creator 218. The COBOL data integrator and processor 220 has modules including a data record schema description receiver 222, a data record schema parser 224, a standardized data record schema creator 226, a data record description receiver 228, a data record schema selector 230, and a data record processor 232.

Figure 3:
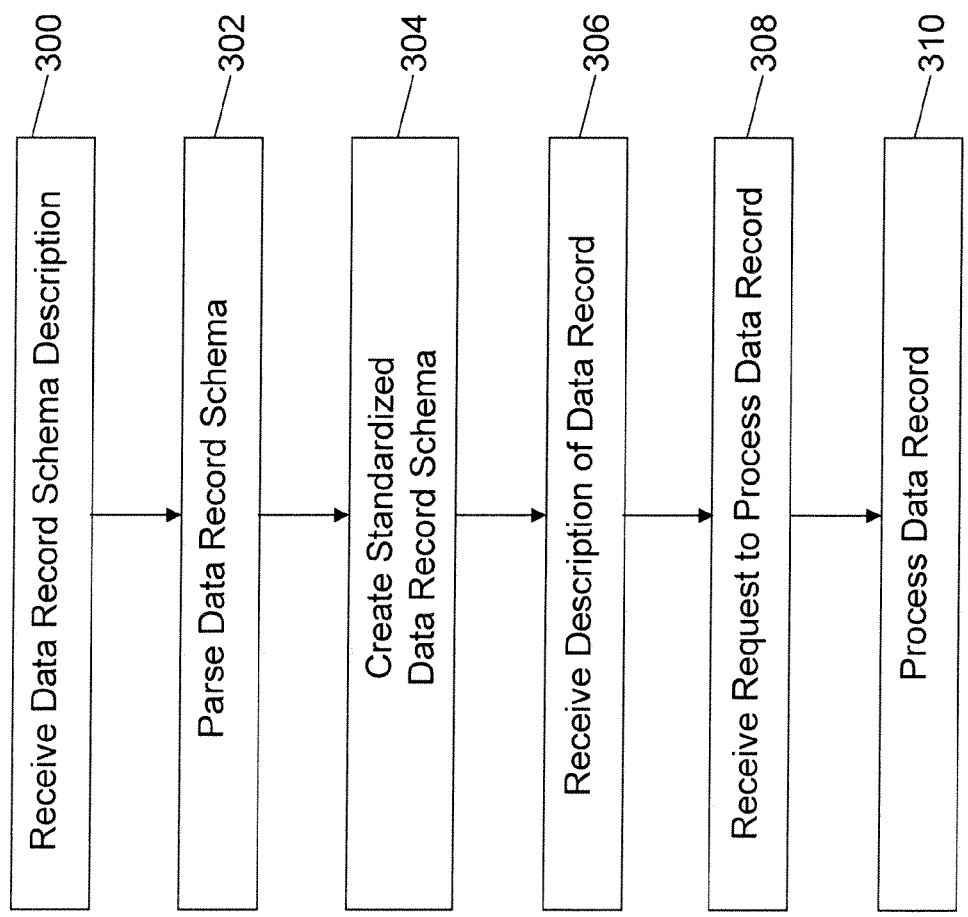
FIG. 3 illustrates operations associated with processing of a data record based on a standardized data record schema derived from a data record schema description, in accordance with one embodiment of the present invention.

FIG. 3 illustrates operations associated with processing of a data record 108 based on a standardized data record schema 104 derived from a COBOL data record schema description 120, in accordance with one embodiment of the present invention. The data record schema description receiver 222 of the COBOL data integrator and processor 220 receives the COBOL data record schema description 120 (block 300) as input from the client 201 via the client interface module 214. The COBOL data record schema description 120 may include information about the format of the COBOL data record schema 122. The client interface module 214 may provide a graphical user interface 216 to accept input from the client 201, and may utilize protocols such as the Hypertext Transfer Protocol (HTTP) for communication with the client 201.

The data record schema parser 224 then parses the COBOL data record schema 122 (block 302). The data record schema parser 224 may use portions of the COBOL data record schema description 120 from the data record schema description receiver 222, such as an identification of the COBOL data record schema 122, to access data sources 202 via the data source interface 240 to obtain the COBOL data record schema 122. The COBOL data record schema 122 may be contained in a COBOL copybook file. The parsing (block 302) may include reading a COBOL statement, such as a line of COBOL code, from the COBOL data record schema 122, and processing the COBOL statement upon determining that the COBOL statement is a COBOL data definition. A COBOL data definition may be a COBOL statement that contains a level number that is an integer from 1 to 49 that is not inside a comment. The data record schema parser 224 may also use format information that may be provided with the COBOL data record schema description 120 to transcode each COBOL statement so that the COBOL statement can be read. This transcoding, for example, may be from EBCDIC to ASCII character encoding.

The parsing (block 302) may include a check that the COBOL data record schema 122 is a nested data record schema. One way of identifying a nested data record schema is through the use of an "OCCURS" clause in a COBOL statement 406 (see FIG. 4A). An "OCCURS" clause identifies a COBOL group, which is several fields grouped together. The COBOL group contains a group item, which is the COBOL statement 406 containing the "OCCURS" clause, and subordinate items, which are COBOL statements with higher level numbers than the group item that are between the group item and the next COBOL statement with a level number equal to or lower than the level number of the group item, or the end of the Data Division.

The parsing (block 302) may also include a check for multiple COBOL data record schemas 122 in a COBOL copybook file. These different COBOL data record schemas 122 in the COBOL copybook file are represented by multiple level "01" data entries (see COBOL statements 1201 of FIG. 12A) that belong to the same file description (FD) entry in the copybook file.

After parsing (block 302), the standardized data record schema creator 226 uses the information obtained by the data record schema parser 224 to create the standardized data record schema 104 (block 304). The standardized data record schema 104 may be stored in the data store 238. The creating (block 304) may include generating a hierarchical structure of field definitions for the standardized data record schema 104 corresponding to the COBOL data record schema 122, and attaching information extracted from a COBOL data definition contained in the COBOL data record schema 122 to a corresponding field definition contained in the standardized data record schema 104. Generating a hierarchical structure of field definitions for the standardized data record schema 104 may include converting a COBOL field definition type from the COBOL data record schema 122, such as "pic x(3)" in the data definition "05 OrderID pic x(3)" (see COBOL statement 404 of FIG. 4A), to a standardized field definition type, such as "varchar(3)" in the standardized field definition 503 labeled "ORDERID" (see FIG. 5), that has a meaning that may be independent of COBOL syntax. The meaning of "varchar(3)" is three alphanumeric characters. Attaching information extracted from a COBOL data definition contained in the COBOL data record schema 122 may include preserving the original COBOL syntax in informational fields attached to the corresponding field definition contained in the standardized data record schema 104. For example, the standardized field definition 503 labeled "ORDERID" (see FIG. 5) may have informational fields preserving COBOL syntax of COBOL statement 404 (see FIG. 4A) such as level number 5, original field name "OrderID", and original picture clause "x(3)".

The creating (block 304) may also include an option to select, for a nested COBOL data record schema 122, whether the standardized data record schema 104 is expanded or collapsed. An expanded data record schema contains a single row for each data record 108, and one column per repetition of nested items in the data record 108. For example, "ItemID" in COBOL statement 408 (see FIG. 4A) is repeated three times due to the "occurs 3 times" clause in COBOL statement 406 (see FIG. 4A). For each of the two data records 108A and 108B (see FIG. 4B), the display 908 (see FIG. 9) shows that there are three columns corresponding to the three repetitions of "ItemID" in COBOL statement 408 (see FIG. 4A). If the nested COBOL data record schema 122 contains a "DEPENDING ON" clause, then the expanded data record schema contains the number of columns corresponding to the maximum possible number of repetitions of nested items based on the "DEPENDING ON" clause. Though a nested standardized data record schema 104 with a single row may be convenient for some database applications, there are relational database management systems that have restrictions on the number of columns that may be exceeded if the expanded data record schema is used.

A collapsed data record schema contains one column per nested item, with the number of rows dependent on both the number of data records 108 and the number of repetitions of nested items in the data record 108. For example, there is one column in the display 908 (see FIG. 9) for "ItemID" in COBOL statement 408 (see FIG. 4A). There are six rows in the display 908, corresponding to each of the two data records 108A and 108B (see FIG. 4B) and to each of the three repetitions of "ItemID" in COBOL statement 408 (see FIG. 4A). The number of rows corresponding to a collapsed data record schema in, for example, a database table containing the contents of the display 908 (see FIG. 9) may be determined based on the contents of the data record 108. The collapsed data record schema may not need to have a number of rows corresponding to the maximum possible number of repetitions of nested items based on a "DEPENDING ON" clause.

The creating (block 304) may also include an option to specify a data record key for the standardized data record schema 104 when there are multiple data record schemas 122 in a COBOL copybook file. For example, the standardized field definition 1402 labeled "KEY" (see FIG. 14) may be selected as the data record key using a checkbox 1406 (see FIG. 14). The standardized field definition 1402 labeled "KEY" (see FIG. 14) may also be used as the data record key by default. In another embodiment, a standardized field definition not labeled "KEY" may be selected as the data record key. The data record key and its specified value may be independently specified for each standardized data record schema 104. The value of the data record key may also be specified using a window pane 1408 (see FIG. 14).

In one embodiment, the data record description receiver 228 then receives a description of the data record 108 (block 306). The description of the data record 108 may be associated with the standardized data record schema 104 after creation (block 304), such as during processing of the data record 108 (block 312). In another embodiment, the description of the data record 108 may be associated with the COBOL data record schema 122 prior to creation of the standardized data record schema 104 (block 304), such as before parsing of the COBOL data record schema 122 (block 302). The description of a data record 108 may contain a parameterized location of the data record 108 corresponding to the data record schema 122, and may contain format information for a COBOL data file containing the data record 108.

Figure 9:
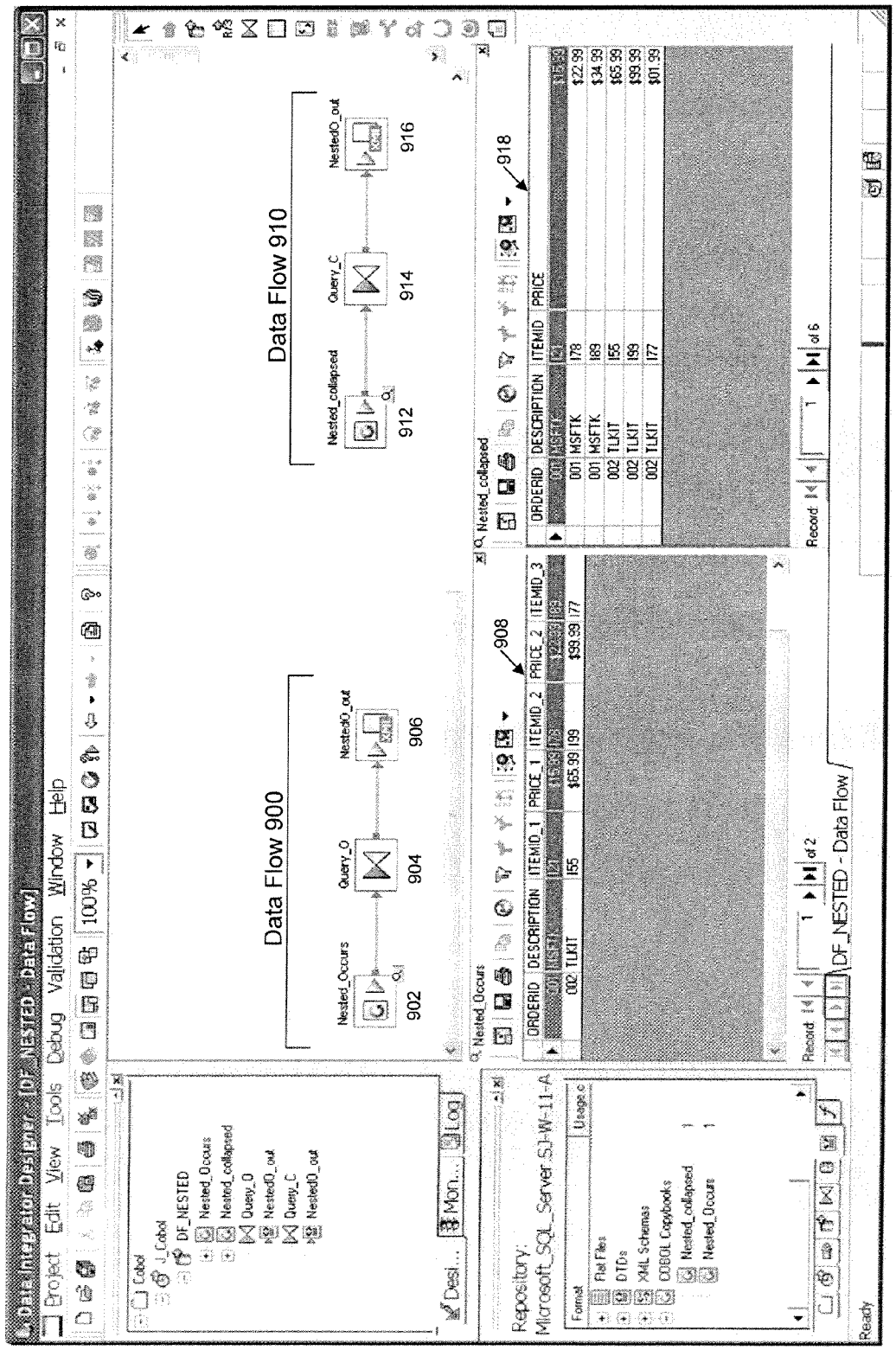
FIG. 9 illustrates a screen shot display of: (1) a data flow linking a first image representing an association of the expanded standardized data record schema of FIG. 5 and the data records of FIG. 4B to a second image representing an Extensible Markup Language (XML) output file, and a display of an excerpt of the data record contents based on the expanded standardized data record schema of FIG. 5, in accordance with one embodiment of the present invention; and (2) a data flow linking a first image representing an association of the collapsed standardized data record schema of FIG. 7 and the data records of FIG. 4B to a second image representing an Extensible Markup Language (XML) output file, and a display of the data record contents based on the collapsed standardized data record schema of FIG. 7, in accordance with one embodiment of the present invention.

In one embodiment, the data record processor 232 then receives a request to process the data record 108 (block 308). The client 201 may input this request via the graphical user interface 218 by selecting a first image 902 representing an association of the standardized data record schema 104 and the data record 108 (see FIG. 9), and selecting a second image. The second image may represent output entities including but not limited to a database table derived from the standardized data record schema 104, and a file in a format such as XML derived from the standardized data record schema 104 (see image 906, "NestedO_out", in FIG. 9). As shown in FIG. 9, the first image 902 and the second image 906 may be linked to represent a data flow 900. The data flow 900 is created by the data flow creator 218 and may represent an association of the standardized data record schema 104, the data record 108, and the output entity. The data flow 900 may include a data transform 904 (see FIG. 9). The data transform 904 may operate on the result of processing the data record 108 based on the standardized data record schema 104. The data transform 904 may include but is not limited to a filtering operation that selects a subset of the result of processing the data record 108 based on the standardized data record schema 104.

The data record processor 232 then processes the data record 108 based on the standardized data record schema 104 (block 310). The data record processor 232 may read a sliding buffer of data from a data file containing one or more data records 108, and may take into account format information for the data record 108 for purposes such as data transcoding. The data record processor 232 may process fields in the data record 108 taking into account COBOL attributes, such as "COMP", that may have vendor-specific meanings. The data record processor 232 may process a variable-length data record 108 or fields within the data record 108 of variable length, and may perform this processing based on a record length field.

The result of the processing (block 310) may be displayed to the user via the graphical user interface 216, and may be exported to an output file such as an XML file. The data format converter 236 may operate on the result to generate the output file. A database table may be created by the database management module 234 to store the result. The database management module may execute a data manipulation language statement dependent on the database table. The data manipulation language statement may be in a query language such as SQL, and may be provided by the client 201 via the graphical user interface 216. The output file and the database table resulting from the processing may be stored in the data store 238, and may be transmitted to clients 201 via the client interface 214.

In one embodiment of processing (block 310), the data record schema selector 230 may designate a standardized data record schema 104 as a selected standardized data record schema 104N for use in processing a COBOL data file containing data records 108 of multiple distinct types, where each type corresponds to an individual standardized data record schema 104. The processing may apply the data record key that may be specified as part of creating the standardized data record schema 104 (block 304). The result of the processing may then include at least some portion of the contents of the data records 108 of the type corresponding to the selected standardized data record schema 104N.

Figure 4A:
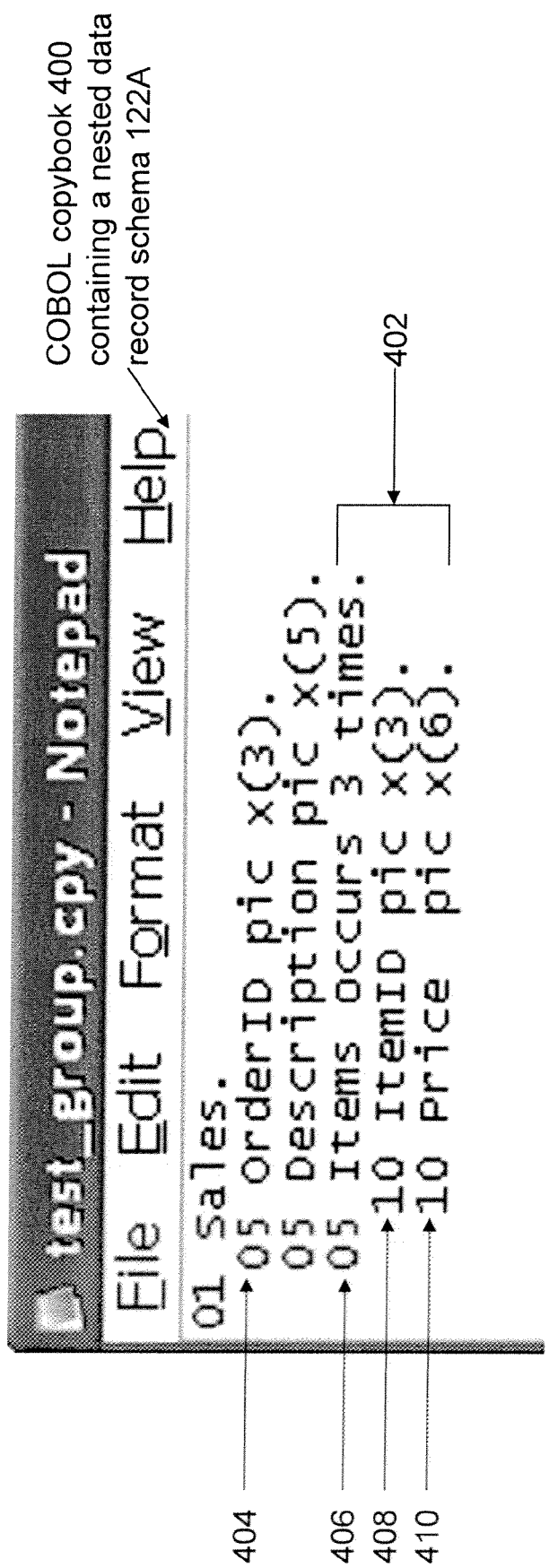
FIG. 4A illustrates a screen shot display of an exemplary COBOL copybook containing a nested data record schema represented in COBOL, in accordance with one embodiment of the present invention.

FIG. 4A illustrates a screen shot display of an exemplary COBOL copybook 400 containing a nested data record schema 122A represented in COBOL, in accordance with one embodiment of the present invention. A COBOL group 402 labeled "Items" in COBOL statement 406 is bracketed. The COBOL statements 408 and 410 within the COBOL group 402, marked with a level number of "10", are repeated three times due to the "occurs 3 times" clause. COBOL statement 404 is referenced elsewhere in this specification.

Figure 4B:
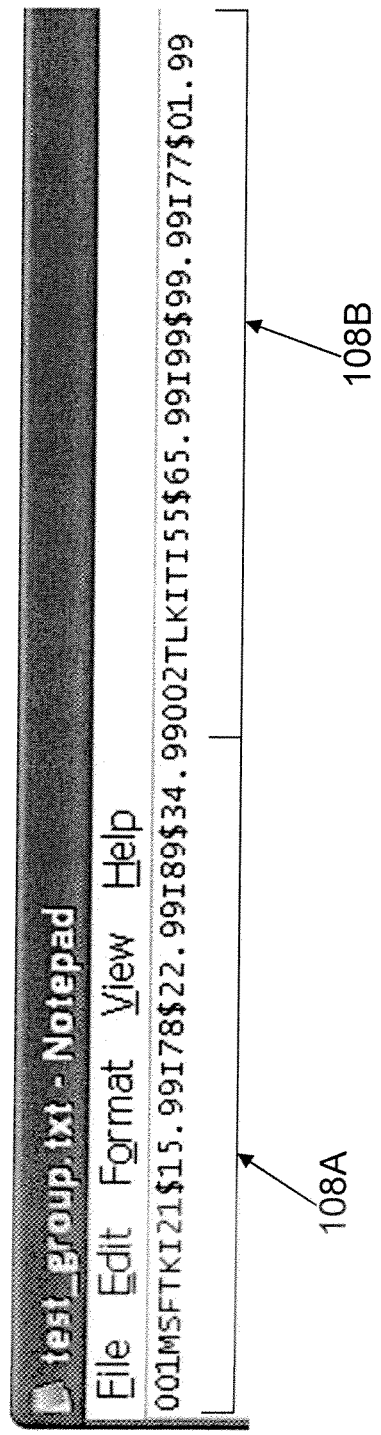
FIG. 4B illustrates a screen shot display of a data file containing two data records corresponding to the nested data record schema of FIG. 4A, in accordance with one embodiment of the present invention.

FIG. 4B illustrates a screen shot display of a data file containing two data records 108A and 108B corresponding to the nested data record schema 122A, in accordance with one embodiment of the present invention.

Figure 5:
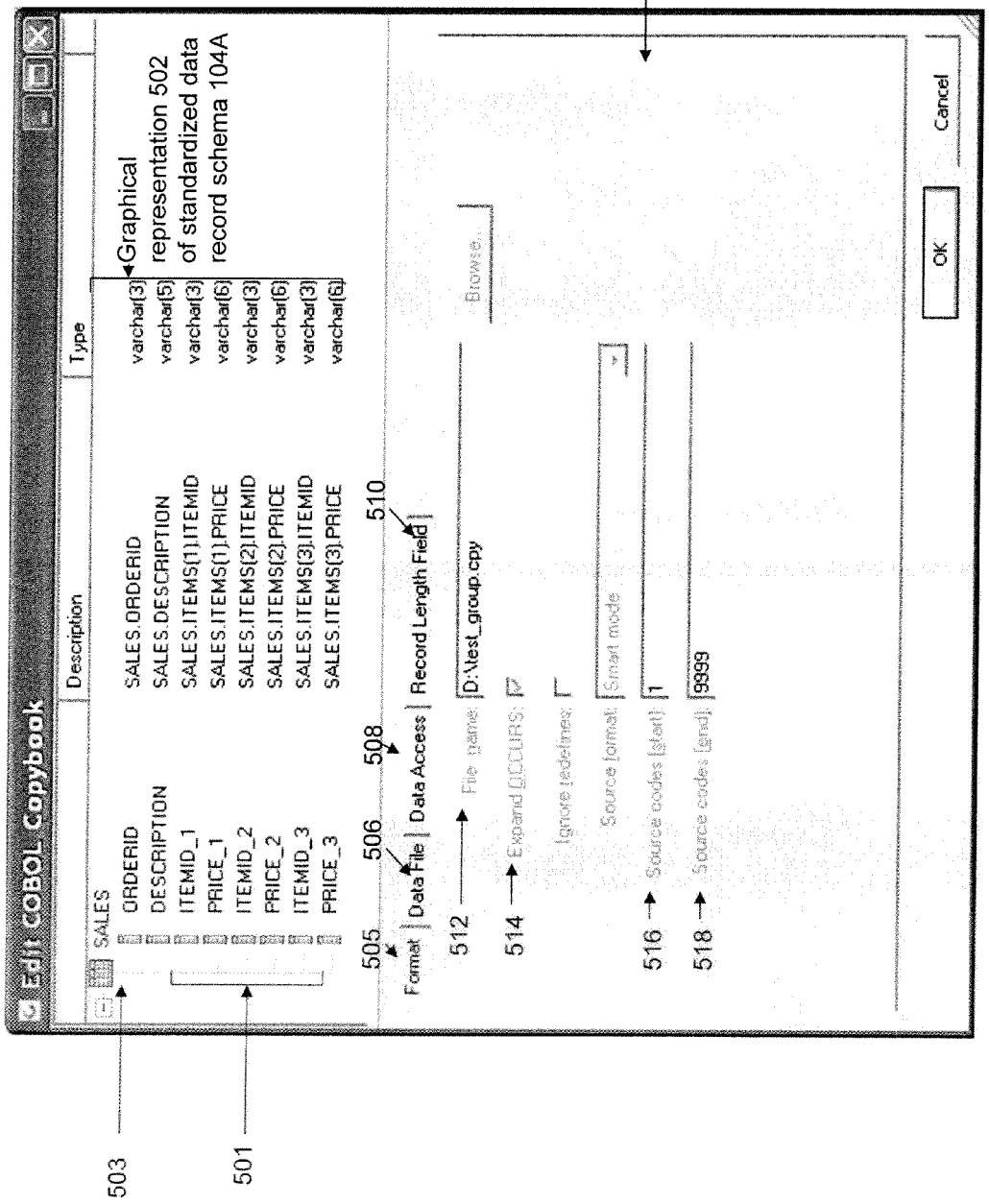
FIG. 5 illustrates a screen shot display of a graphical representation of a standardized data record schema based on the nested data record schema of FIG. 4A and having an expanded hierarchical structure of field definitions, and of a window pane for entering information about the format of the COBOL copybook of FIG. 4A, in accordance with one embodiment of the present invention.

FIG. 5 illustrates a screen shot display of a graphical representation 502 of a standardized data record schema 104A based on the nested data record schema 122A of FIG. 4A and having an expanded hierarchical structure 501 of field definitions, and of a window pane 504 for entering information about the format of the COBOL copybook 400 of FIG. 4A, in accordance with one embodiment of the present invention. The expanded hierarchical structure 501 of standardized field definitions is derived from the COBOL group 402. In this embodiment, the data definitions "ItemID" and "Price" in COBOL statements 408 and 410 correspond to standardized field definitions with suffixes, such as "ITEMID_1" and "PRICE_1", within the expanded hierarchical structure 501. In this embodiment, the portion of the graphical representation 502 of the standardized data record schema 104A not corresponding to the COBOL group 402 is not suffixed, such as "ORDERID" in the standardized field definition 503. The window pane 504 may contain various tabs 505, 506, 508, and 510. In this embodiment, the "Format" tab 505 allows the client 201 to enter a COBOL copybook file name in item 512, and to enter source code start and end in items 516 and 518. Source code start and end are a type of format information that define the start and end columns of the COBOL copybook for purposes of parsing the one or more COBOL data record schemas 122 contained in the COBOL copybook. In this embodiment, the "Expand OCCURS" box 514 is checked to indicate that the standardized data record schema 104A was created as an expanded data record schema.

Figure 6:
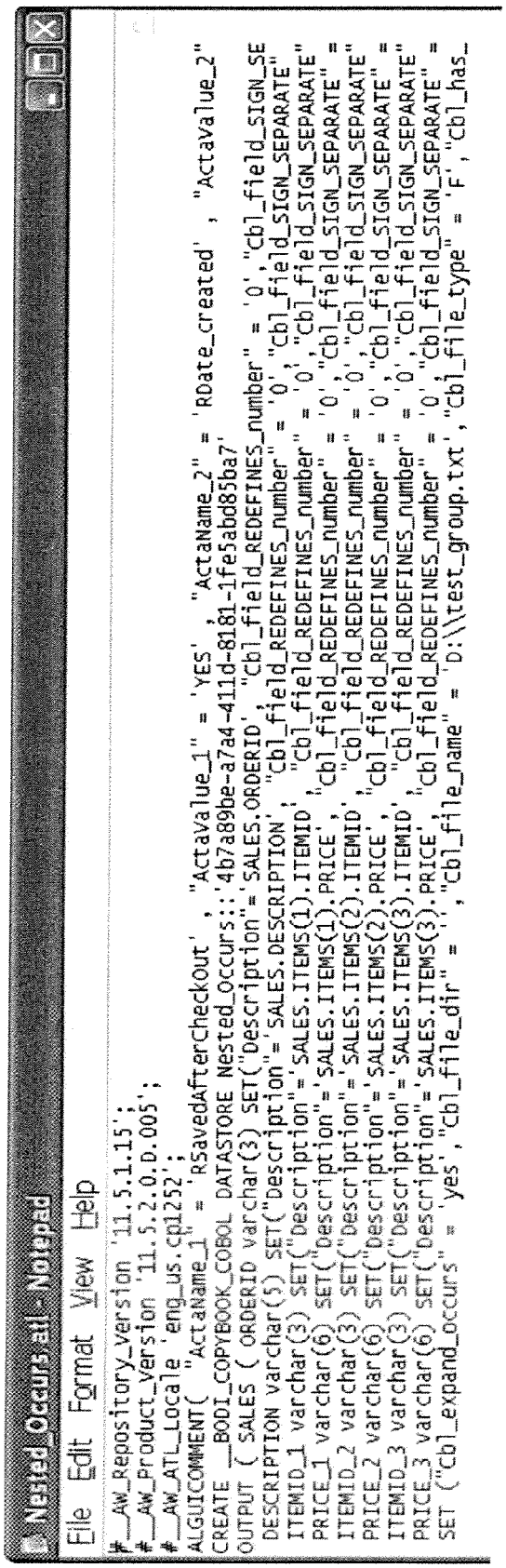
FIG. 6 illustrates a screen shot display of an excerpt of a textual representation of the standardized data record schema of FIG. 5, in accordance with one embodiment of the present invention.

FIG. 6 illustrates a screen shot display of an excerpt of a textual representation of the standardized data record schema 104A of FIG. 5, in accordance with one embodiment of the present invention. This textual representation is in ATL, and corresponds to the graphical representation 502 of the standardized data record schema 104A.

Figure 7:
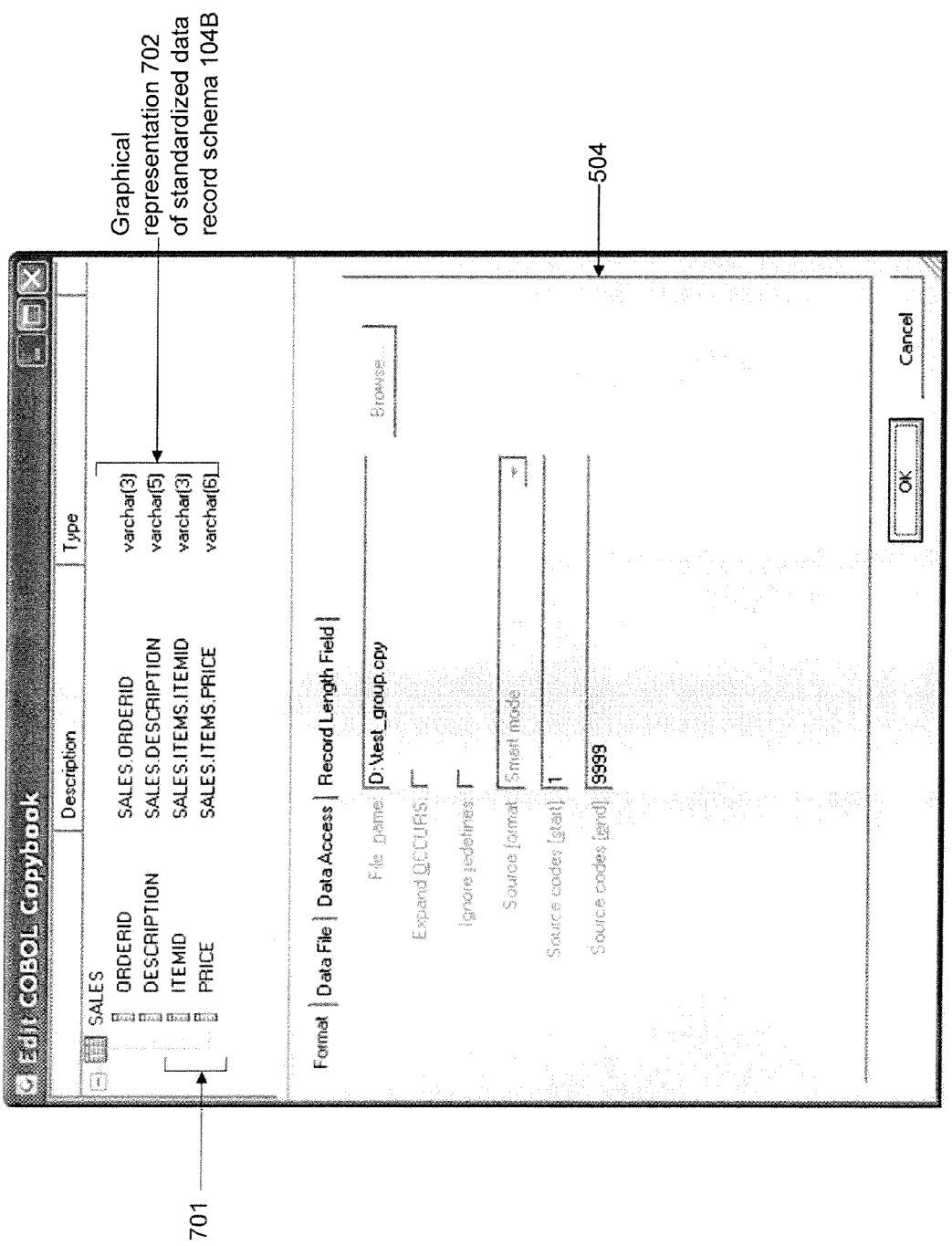
FIG. 7 illustrates a screen shot display of a graphical representation of a standardized data record schema based on the nested data record schema of FIG. 4A and having a collapsed hierarchical structure of field definitions, and of the window pane of FIG. 5, in accordance with one embodiment of the present invention.

FIG. 7 illustrates a screen shot display of a graphical representation 702 of a standardized data record schema 104B based on the nested data record schema 122A of FIG. 4A and having a collapsed hierarchical structure 706 of field definitions, and of the window pane 504 of FIG. 5, in accordance with one embodiment of the present invention. The collapsed hierarchical structure 701 of standardized field definitions is derived from the COBOL group 402. In this embodiment, the data definitions "ItemID" and "Price" in COBOL statements 408 and 410 correspond to single standardized field definitions "ITEMID" and "PRICE" within the collapsed hierarchical structure 701. These standardized field definitions correspond to, for example, database table columns. The number of rows in the database table may be determined at run-time. In this embodiment, the "Expand OCCURS" box 514 in the window pane 504 is unchecked to indicate that the standardized data record schema 104A was created as a collapsed data record schema.

Figure 8:
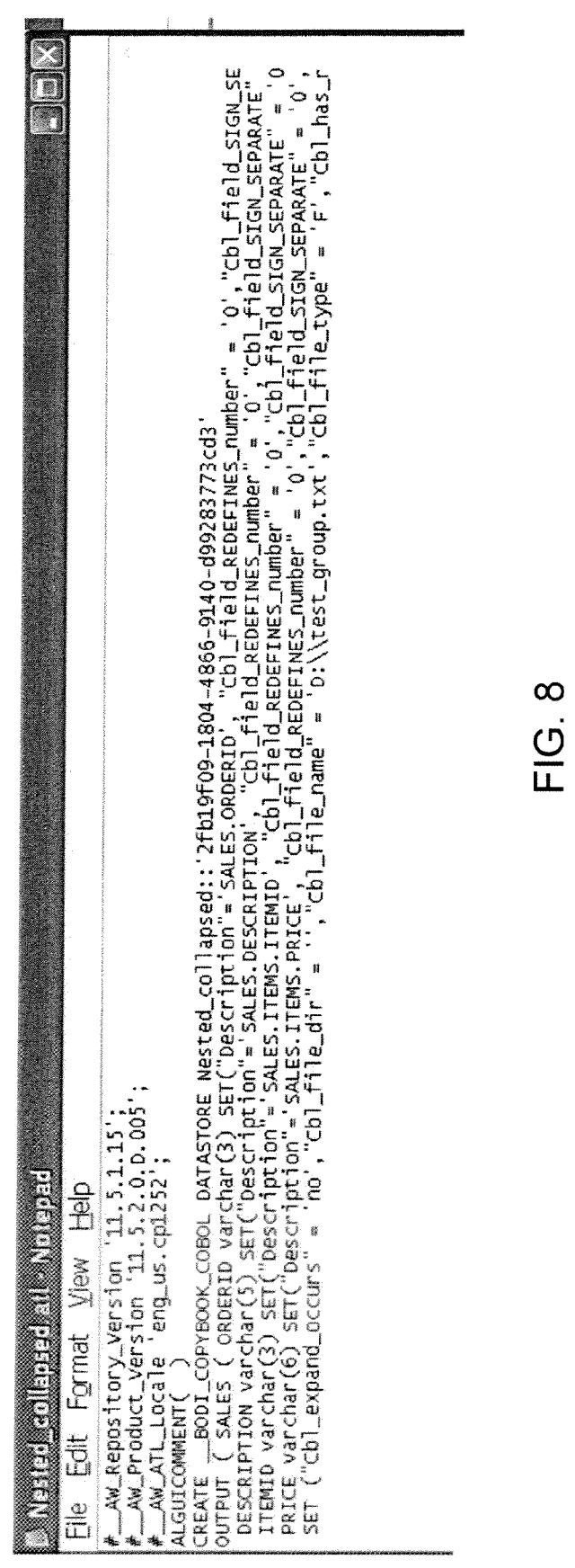

FIG. 8 illustrates a screen shot display of a textual representation of the standardized data record schema 104B of FIG. 7, in accordance with one embodiment of the present invention. This textual representation is in ATL, and corresponds to the graphical representation 702 of the standardized data record schema 104B.

FIG. 9 illustrates a screen shot display of: (1) a data flow 900 linking a first image 902 representing an association of the expanded standardized data record schema 104A of FIG. 5 and the data records 108A and 108B of FIG. 4B to a second image 906 representing an XML output file, and a display 908 of an excerpt of the contents of the data record contents 108A and 108B based on the expanded standardized data record schema 104A of FIG. 5, in accordance with one embodiment of the present invention; and (2) a data flow 910 linking a first image 912 representing an association of the collapsed standardized data record schema of FIG. 7 and the data records of FIG. 4B to a second image 916 representing an Extensible Markup Language (XML) output file, and a display 918 of the contents of the data records 108A and 108B based on the collapsed standardized data record schema of FIG. 7, in accordance with one embodiment of the present invention. The "Query_O" image 904 and the "Query_C" image 914 represent data transforms that may be included as part of the data flows 900 and 910, respectively. In this example, the "Query_O" and "Query_C" data transforms are identity transforms that make no changes to the results of the processing specified by the data flows 900 and 910.

FIG. 10 illustrates a screen shot display of the XML file of FIG. 9 (represented by the image 906) linked to the expanded standardized data record schema 104A of FIG. 5, in accordance with one embodiment of the present invention. Portions 1000 and 1002 of the XML file show the contents of data records 108A and 108B, respectively, mapped to field definitions corresponding to the expanded standardized data record schema 104A.

FIG. 11 illustrates a screen shot display of the XML file of FIG. 9 (represented by the image 916) linked to the collapsed standardized data record schema 104B of FIG. 7, in accordance with one embodiment of the present invention. Portions 1100 and 1102 of the XML file show the contents of data records 108A and 108B, respectively, mapped to field definitions corresponding to the collapsed standardized data record schema 104B.

Figure 12A:
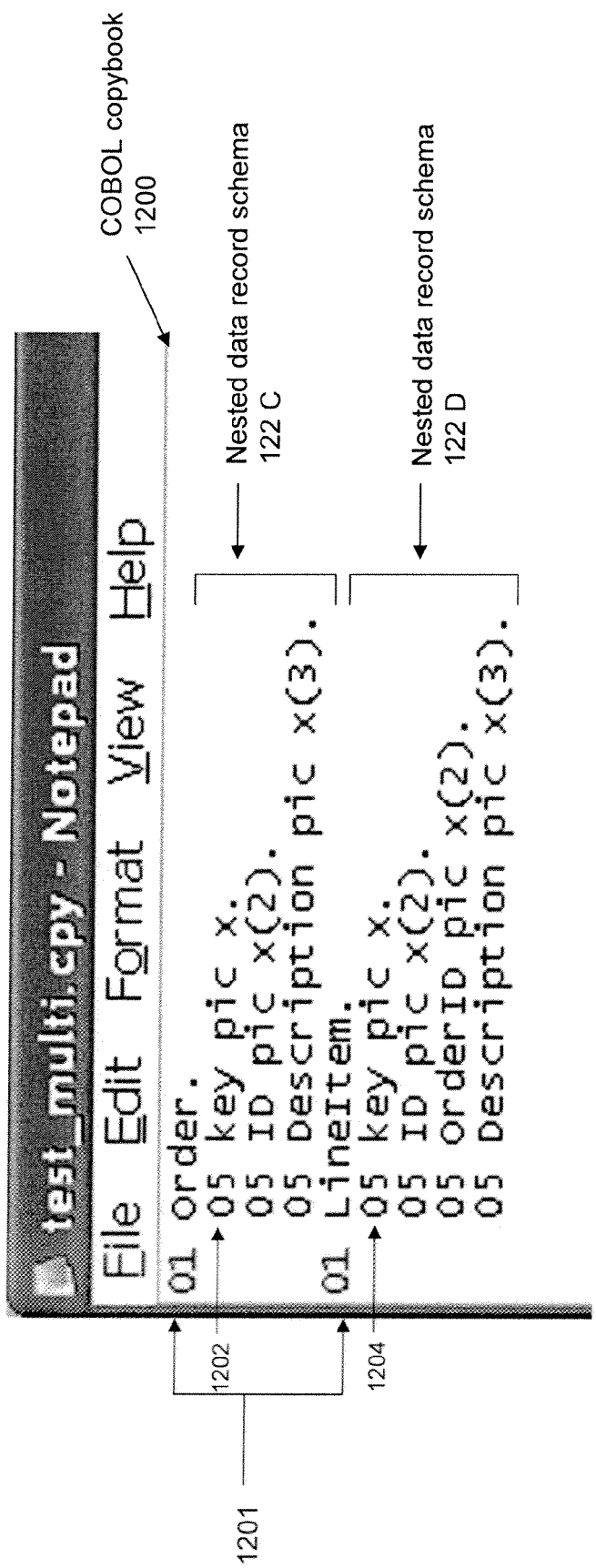
FIG. 12A illustrates a screen shot display of an exemplary COBOL copybook containing two data record schemas represented in COBOL, the "Order" data record schema and the "LineItem" data record schema, in accordance with one embodiment of the present invention.

FIG. 12A illustrates a screen shot display of an exemplary COBOL copybook 1200 containing two data record schemas represented in COBOL, the "Order" data record schema 122C and the "LineItem" data record schema 122D, in accordance with one embodiment of the present invention. The two level "01" COBOL statements 1201 indicate the start of the "Order" data record schema 122C and the start of the "LineItem" data record schema 122D, respectively. The COBOL statements 1202 and 1204 show the "key" field definitions for the "Order" data record schema 122C and the start of the "LineItem" data record schema 122D, respectively.

Figure 12B:
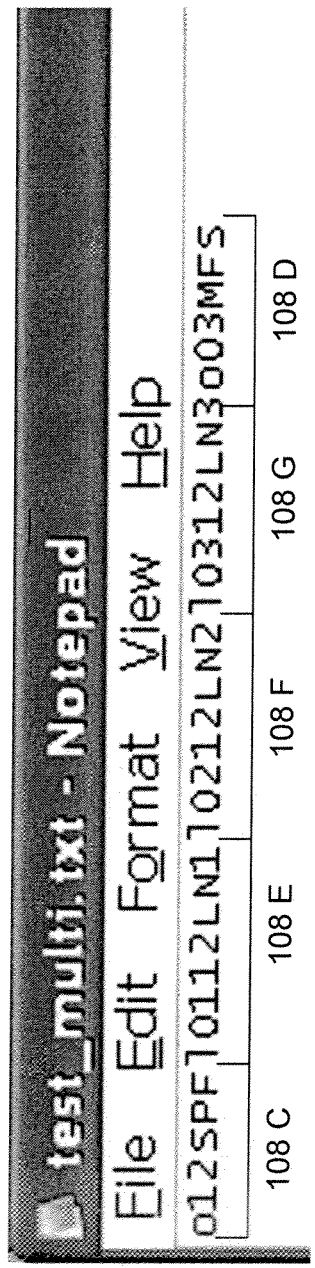
FIG. 12B illustrates a screen shot display of a data file containing five data records corresponding to the two data record schemas of FIG. 12A, in accordance with one embodiment of the present invention.

FIG. 12B illustrates a screen shot display of a data file containing five data records 108C-108G corresponding to the two data record schemas 122C and 122D of FIG. 12A, in accordance with one embodiment of the present invention.

Figure 12C:
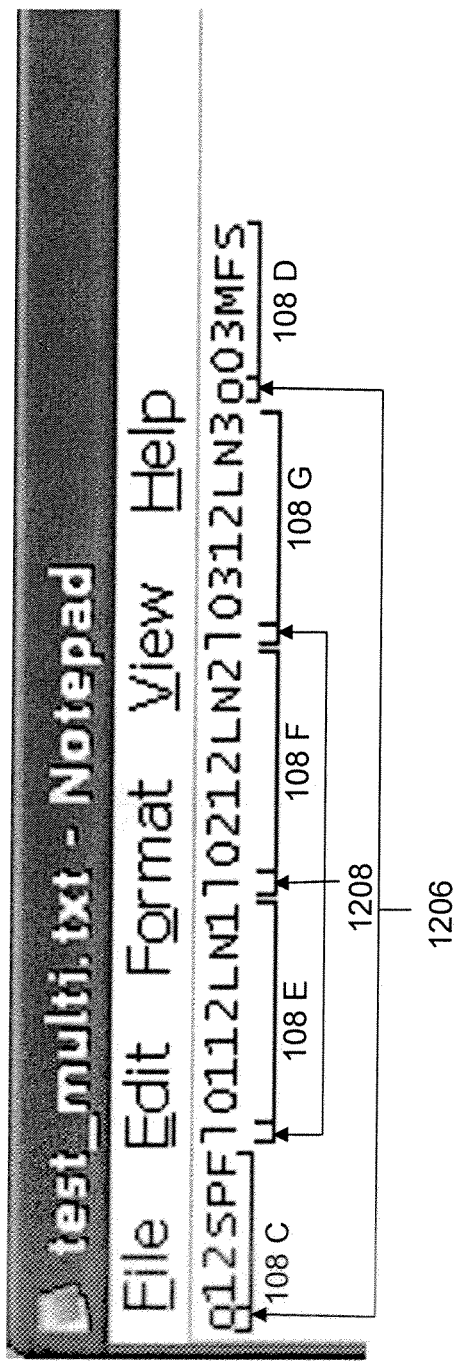
FIG. 12C illustrates a screen shot display of the data file of FIG. 12B, with the values of the "KEY" fields of the five data records individually bracketed, in accordance with one embodiment of the present invention.

FIG. 12C illustrates a screen shot display of the data file of FIG. 12B, with the values 1206 and 1208 of the "KEY" fields 1202 and 1204 of the five data records 108C-108G individually bracketed, in accordance with one embodiment of the present invention. The bracketed values 1206 and 1208 indicate that the data file contains data records 108 corresponding to both the "Order" COBOL data record schema 122C and the "LineItem" COBOL data record schema 122D.

Figure 13:
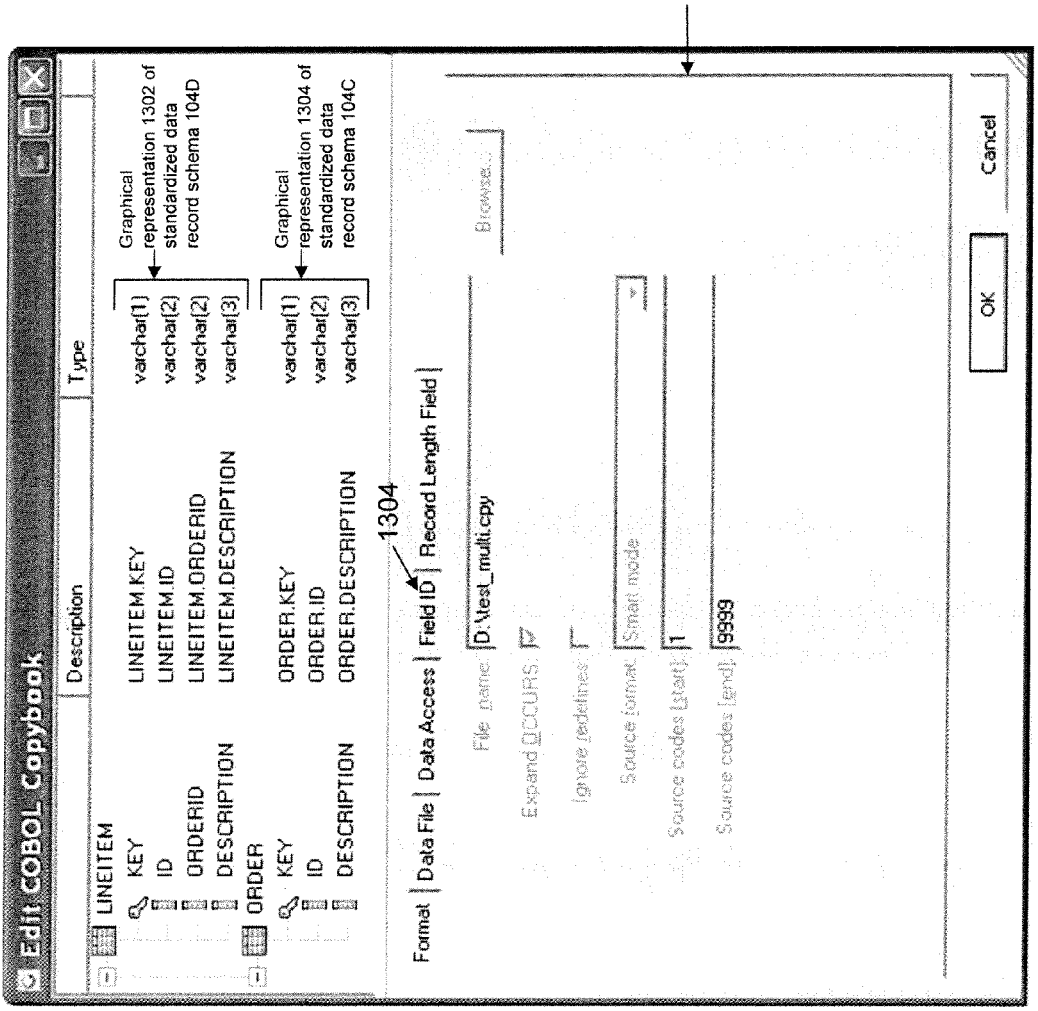
FIG. 13 illustrates a screen shot display of graphical representations of two standardized data record schemas, the "ORDER" standardized data record schema and the "LINEITEM" standardized data record schema, based on the two data record schemas of FIG. 12A, and of a window pane for entering information about the format of the COBOL copybook of FIG. 12A, in accordance with one embodiment of the present invention.

FIG. 13 illustrates a screen shot display of graphical representations 1300 and 1302 of two standardized data record schemas, the "ORDER" standardized data record schema 104C and the "LINEITEM" standardized data record schema 104D, based on the two data record schemas 122C and 122D of FIG. 12A, and of a window pane 504 for entering information about the format of the COBOL copybook 1200 of FIG. 12A, in accordance with one embodiment of the present invention. A "Field ID" tab 1304 may be included in the window pane 504 to enable the user to enter input related to the data record keys of the "ORDER" standardized data record schema 104C and the "LINEITEM" standardized data record schema 104D.

Figure 14:
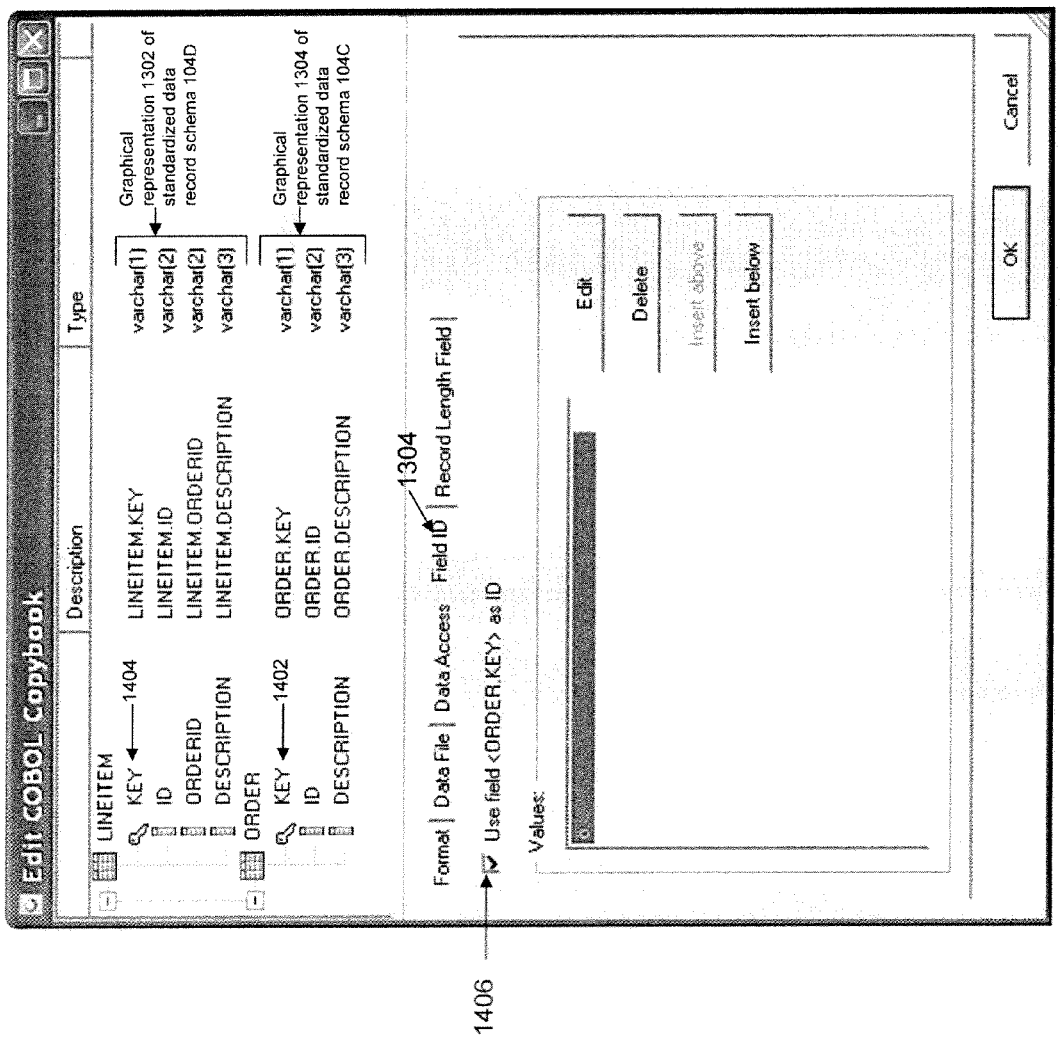
FIG. 14 illustrates a screen shot display of the two standardized data record schemas of FIG. 13, and of a window pane tab for specifying a data record key for one of the two standardized data record schemas, in accordance with one embodiment of the present invention.

FIG. 14 illustrates a screen shot display of the two standardized data record schemas 104C and 104D of FIG. 13, and of a window pane tab 1304 for specifying a data record key for one of the two standardized data record schemas 104C and 104D, in accordance with one embodiment of the present invention. In this embodiment, the checkbox 1406 to use the "KEY" field as the data record key of the "ORDER" standardized data record schema 104C is checked, and the value "o" of the "KEY" field is selected. A similar user interface may be provided to configure the "KEY" field as the data record key of the "LINEITEM" standardized data record schema 104D. If the checkbox 1406 is not checked, then a different field of the "ORDER" standardized data record schema 104C may be selected as the data record key of the "ORDER" standardized data record schema 104C.

Figure 15:
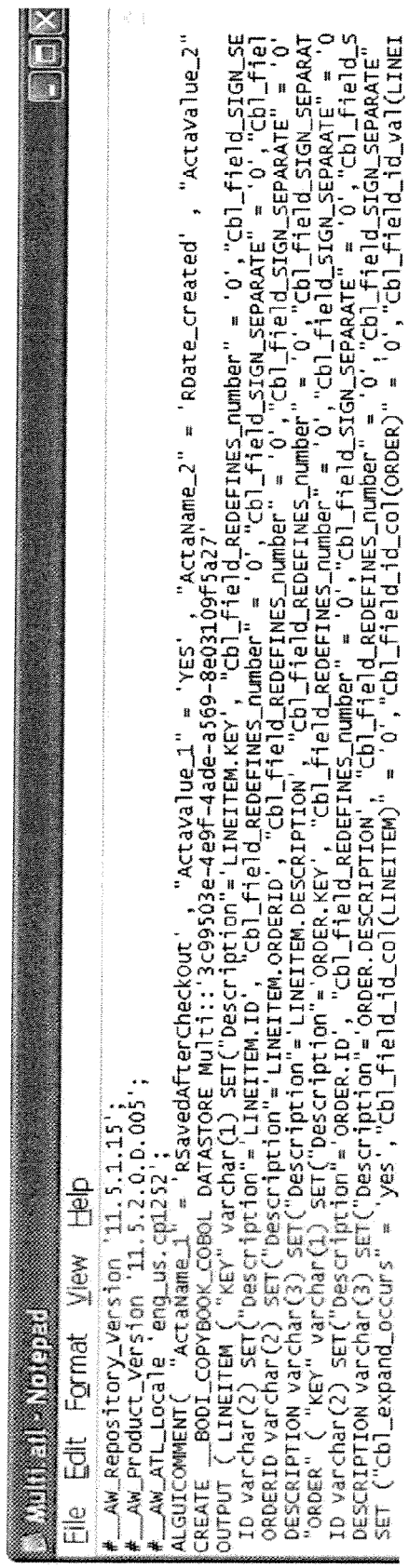
FIG. 15 illustrates a screen shot display of an excerpt of a textual representation of the two standardized data record schemas of FIG. 13, in accordance with one embodiment of the present invention.

FIG. 15 illustrates a screen shot display of a textual representation of the two standardized data record schemas 104C and 104D of FIG. 13, in accordance with one embodiment of the present invention. This textual representation is in ATL, and corresponds to the graphical representations 1300 and 1302 of the standardized data record schemas 104C and 104D, respectively.

Figure 16:
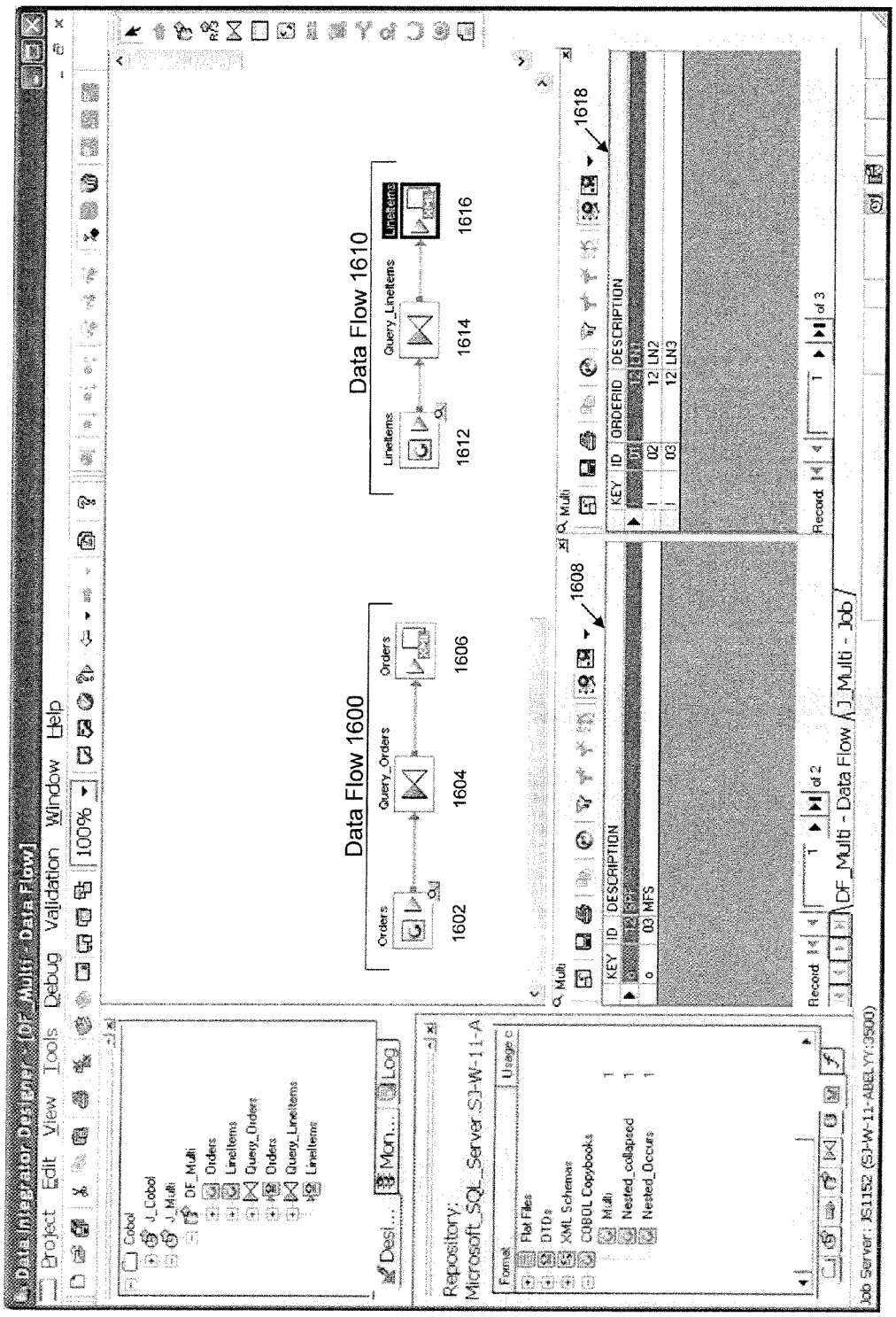
FIG. 16 illustrates a screen shot display of two data flows, each data flow linking a first image representing an association of one of the two standardized data record schemas of FIG. 13 and the data records of FIG. 12B to a second image representing an XML output file, and of two displays of the contents of the data records, each display based on one of the two standardized data record schemas of FIG. 13, in accordance with one embodiment of the present invention.

FIG. 16 illustrates a screen shot display of two data flows 1600 and 1610, each data flow linking a first image (1602 and 1612, respectively) representing an association of one of the two standardized data record schemas of FIG. 13 (104C and 104D, respectively) and the data records 108C-108G of FIG. 12B to a second image (1606 and 1616, respectively) representing an XML output file, and of two displays (1608 and 1618, respectively) of the contents of the data records 108C-108G, each display based on one of the two standardized data record schemas of FIG. 13 (104C and 104D, respectively), in accordance with one embodiment of the present invention. The "Query_Orders" image 1604 and the "Query_LineItems" image 1614 represent data transforms that may be included as part of the data flows 1600 and 1610, respectively. In this example, the "Query_Orders" and "Query_LineItems" data transforms are identity transforms that make no changes to the results of the processing specified by the data flows 1600 and 1610. The display 1608 contains the contents of the data records 108C and 108D corresponding to the "ORDER" standardized data record schema 104C, and the display 1618 contains the contents of the data records 108E-108G corresponding to the "LINEITEM" standardized data record schema 104D.

Figure 17:
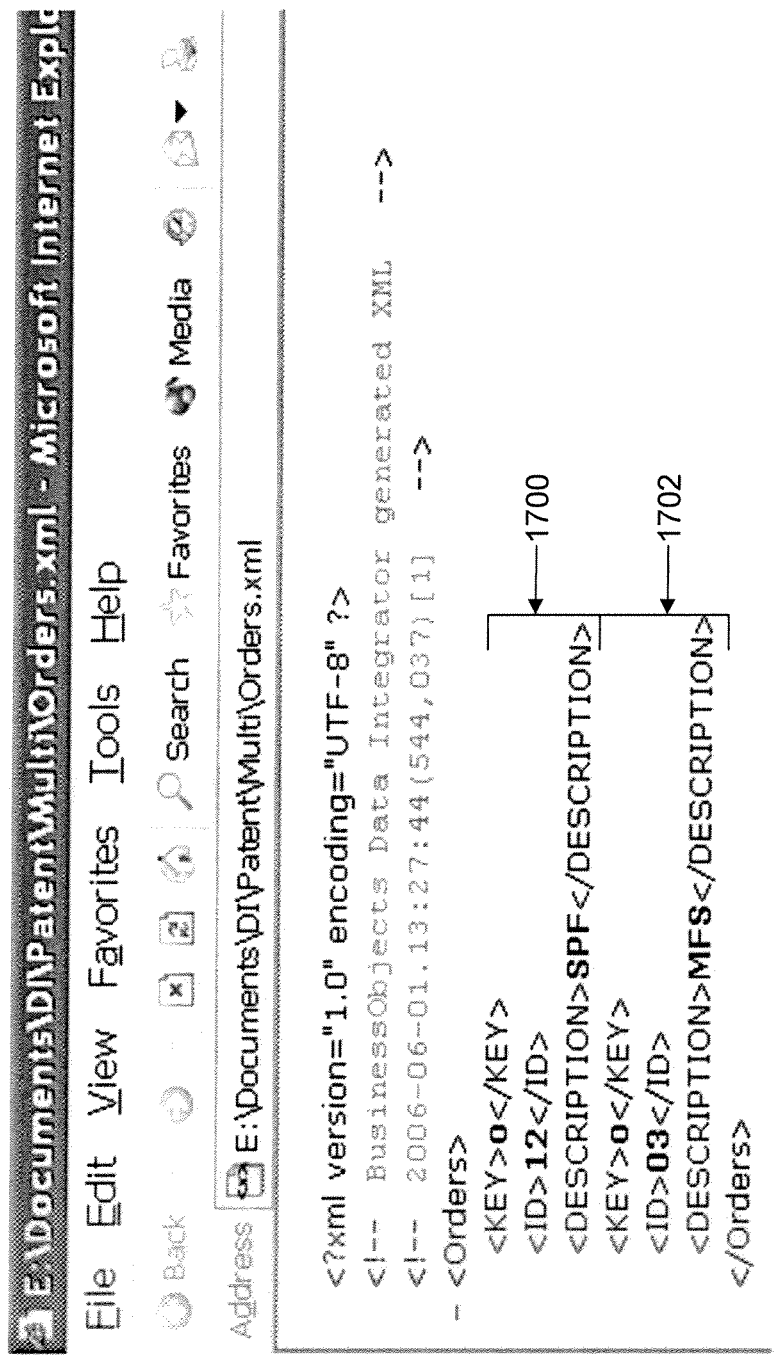
FIG. 17 illustrates a screen shot display of the XML file of FIG. 16 corresponding to the "ORDER" standardized data record schema, in accordance with one embodiment of the present invention.

FIG. 17 illustrates a screen shot display of the XML file of FIG. 16 (represented by the image 1606) corresponding to the "ORDER" standardized data record schema 104C, in accordance with one embodiment of the present invention. Portions 1700 and 1702 of the XML file show the contents of data records 108C and 108D, respectively, mapped to field definitions corresponding to the "ORDER" standardized data record schema 104C.

Figure 18:
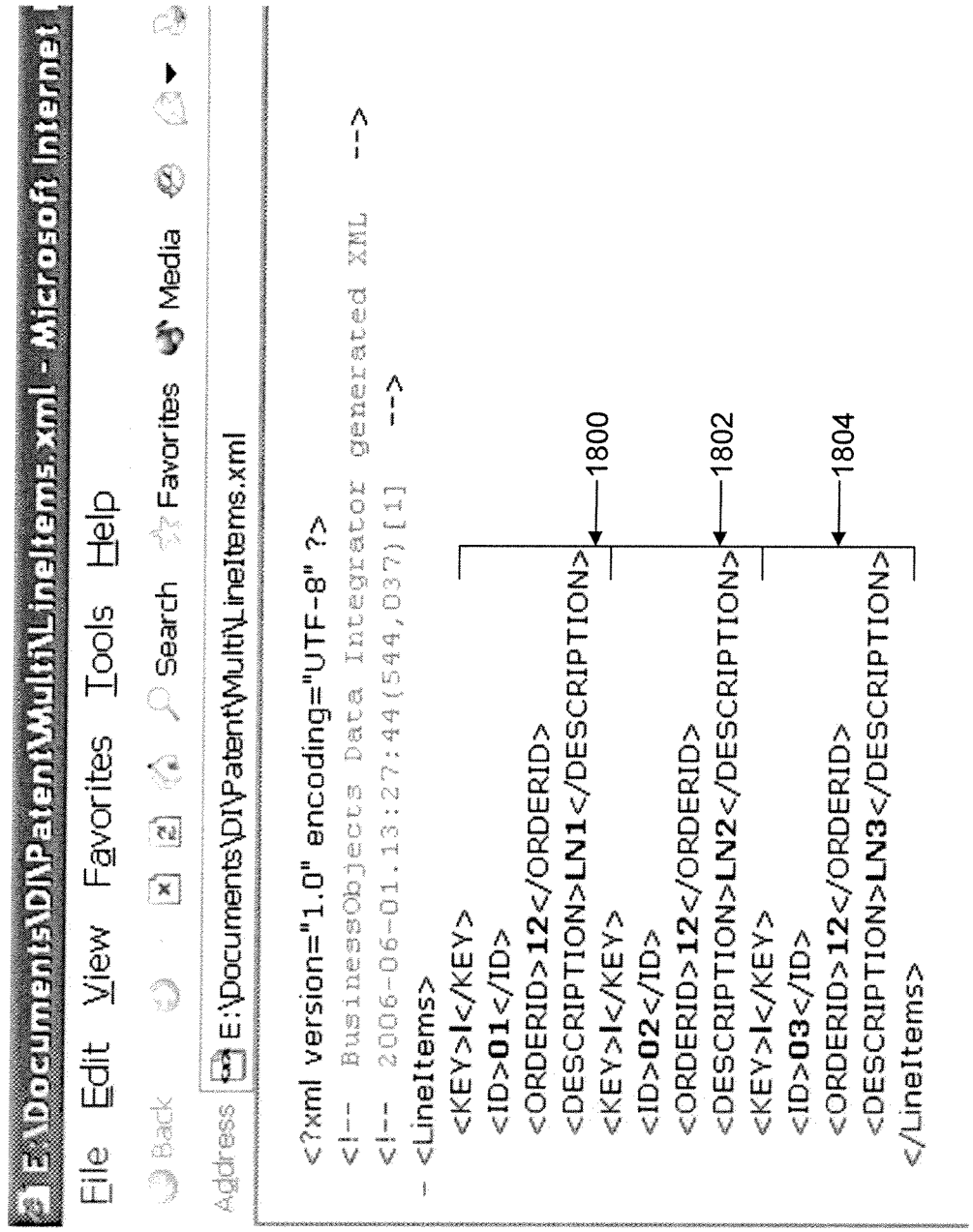
FIG. 18 illustrates a screen shot display of the XML file of FIG. 16 corresponding to the "LINEITEM" standardized data record schema, in accordance with one embodiment of the present invention.

FIG. 18 illustrates a screen shot display of the XML file of FIG. 16 (represented by the image 1616) corresponding to the "LINEITEM" standardized data record schema 104D, in accordance with one embodiment of the present invention. Portions 1800, 1802, and 1804 of the XML file shows the contents of data records 108E-108G, respectively, mapped to field definitions corresponding to the "LINEITEM" standardized data record schema 104D.

Certain embodiments of the invention relate to a computer storage product with a computer-readable medium including data structures and computer code for performing a set of computer-implemented operations. The medium and computer code can be those specially designed and constructed for the purposes of the invention, or they can be of the kind well known and available to those having ordinary skill in the computer software arts. Examples of computer-readable media include: magnetic media such as hard disks, floppy disks, and magnetic tape; optical media such as Compact Disc-Read Only Memories ("CD-ROMs") and holographic devices; magneto-optical media such as floptical disks; and hardware devices that are specially configured to store and execute computer code, such as Application-Specific Integrated Circuits ("ASICs"), Programmable Logic Devices ("PLDs"), Read Only Memory ("ROM") devices, and Random Access Memory ("RAM") devices. Examples of computer code include machine code, such as produced by a compiler, and files including higher-level code that are executed by a computer using an interpreter. For example, an embodiment of the invention can be implemented using Java, C++, or other object-oriented programming language and development tools. Additional examples of computer code include encrypted code and compressed code. Another embodiment of the invention can be implemented in hard-wired circuitry in place of, or in combination with, computer code.

From the foregoing, it can be seen that an apparatus and method for processing COBOL data record schemas having disparate formats are described. The foregoing description, for purposes of explanation, used specific nomenclature to provide a thorough understanding of the invention. It will be appreciated, however, that embodiments of the invention can be in other specific forms without departing from the spirit or essential characteristics thereof. The described embodiments are not intended to be exhaustive or to limit the invention to the precise forms disclosed; obviously, many modifications and variations are possible in view of the above teachings. The presently disclosed embodiments are, therefore, considered in all respects to be illustrative and not restrictive. The embodiments were chosen and described in order to best explain the principles of the invention and its practical applications; they thereby enable others skilled in the art to best utilize the invention and various embodiments with various modifications as are suited to the particular use contemplated. It is intended that the following claims and their equivalents define the scope of the invention.

What is claimed is:

1. A method for implementation by one or more data processors comprising:

receiving, by at least one data processor, a first data record schema and a second data record schema, wherein the first data record schema differs from the second data record schema in at least one of endianness, character encoding and localization;

converting, by at least one data processor, the first data record schema into a first representation and the second data record schema into a second representation, wherein the first representation and the second representation have a common encoding or syntax that is independent of the at least one of endianness, character encoding and localization;

creating, by at least one data processor, a standardized data record schema based on the first representation and the second representation;

receiving, by at least one data processor, a parameterized location of a data record corresponding to a Common Business Oriented Language (COBOL) copybook and information about the data record format; and processing, by at least one data processor, the data record based on the standardized data record schema;

wherein the standardized data record schema is created by (i) generating a hierarchical structure of field definitions for the standardized data record schema corresponding to the COBOL copybook, and (ii) attaching information extracted from a COBOL data definition contained in the COBOL copybook to a corresponding field definition contained in the standardized data record schema.

2. The method of claim 1 further comprising:

creating, by at least one data processor, a database table based on the standardized data record schema and the data record; and executing, by at least one data processor, a data manipulation language statement dependent on the database table.

3. The method of claim 2 further comprising:

selecting, by at least one data processor, a first displayed image representing an association of the standardized data record schema and the data record; and selecting, by at least one data processor, a second displayed image representing the database table.

4. The method of claim 3 further comprising:

linking, by at least one data processor, the first displayed image and the second displayed image to represent a data flow.

5. The method of claim 4, wherein the linking comprises specifying a data transform.

6. The method of claim 1, wherein the format of the COBOL copybook is one of a system-specific format and an application-specific format.

7. The method of claim 1 further comprising:

reading, by at least one data processor, a COBOL statement from the COBOL copybook; and processing, by at least one data processor, the COBOL statement upon determining that the COBOL statement is a COBOL data definition.

8. The method of claim 1 further comprising:

receiving a description of a data file containing the data record.

9. The method of claim 1, wherein the parsing comprises determining that the COBOL copybook contains a nested data record schema, and wherein the creating comprises providing an option to select a type of the standardized data record schema from an expanded data record schema and a collapsed data record schema.

10. A non-transitory computer readable medium forming a computer storage product, comprising executable instructions to:
- receive a first data record schema and a second data record schema, wherein the first data record schema differs from the second data record schema in at least one of endianness, character encoding and localization;
- convert the first data record schema into a first representation and the second data record schema into a second representation, wherein the first representation and the second representation have a common encoding or syntax that is independent of the at least one of endianness, character encoding and localization;
- create a standardized data record schema based on the first representation and the second representation;
- receive a parameterized location of a data record corresponding to a Common Business Oriented Language (COBOL) copybook and information about the data record format; and
- process the data record based on the standardized data record schema;
- wherein the standardized data record schema is created by (i) generating a hierarchical structure of field definitions for the standardized data record schema corresponding to the COBOL copybook, and (ii) attaching information extracted from a COBOL data definition contained in the COBOL copybook to a corresponding field definition contained in the standardized data record schema.

11. The computer readable medium of claim 10, further comprising executable instructions to:
- create a database table based on the standardized data record schema and the data record; and
- execute a data manipulation language statement dependent on the database table.

12. The computer readable medium of claim 11, further comprising executable instructions to receive a request to process the data record including executable instructions to:
- select a first displayed image representing an association of the standardized data record schema and the data record; and
- select a second displayed image representing the database table.

13. The computer readable medium of claim 12, further comprising executable instructions to link the first displayed image and the second displayed image to represent a data flow.

14. The computer readable medium of claim 13, wherein the executable instructions to link include executable instructions to specify a data transform.

15. The computer readable medium of claim 10, wherein the format of the COBOL copybook is one of a system-specific format and an application-specific format.

16. The computer readable medium of claim 10, wherein the executable instructions to parse include executable instructions to:
- read a COBOL statement from the COBOL copybook; and
- process the COBOL statement upon determining that the COBOL statement is a COBOL data definition.

17. The computer readable medium of claim 10, further comprising executable instructions to receive a description of a data file containing the data record.

18. The computer readable medium of claim 10, wherein the executable instructions to parse include executable instructions to determine that the COBOL copybook contains a nested data record schema, and wherein the executable instructions to create include executable instructions to provide an option to select a type of the standardized data record schema from an expanded data record schema and a collapsed data record schema.

19. A system comprising:
- at least one data processor; and
- memory storing instructions, which when executed by the at least one data processor, result in operations comprising:
  - receiving a first data record schema and a second data record schema, wherein the first data record schema differs from the second data record schema in at least one of endianness, character encoding and localization;
  - converting the first data record schema into a first representation and the second data record schema into a second representation, wherein the first representation and the second representation have a common encoding or syntax that is independent of the at least one of endianness, character encoding and localization;
  - creating a standardized data record schema based on the first representation and the second representation;
  - receiving a parameterized location of a data record corresponding to a Common Business Oriented Language (COBOL) copybook and information about the data record format; and
  - processing the data record based on the standardized data record schema;
  - wherein the standardized data record schema is created by (i) generating a hierarchical structure of field definitions for the standardized data record schema corresponding to the COBOL copybook, and (ii) attaching information extracted from a COBOL data definition contained in the COBOL copybook to a corresponding field definition contained in the standardized data record schema.

20. The system of claim 19, wherein the operations further comprise:
- creating a database table based on the standardized data record schema and the data record; and
- executing a data manipulation language statement dependent on the database table.

21. The system of claim 20, wherein the operations further comprise:
- selecting, by at least one data processor, a first displayed image representing an association of the standardized data record schema and the data record; and
- selecting, by at least one data processor, a second displayed image representing the database table.

22. The system of claim 21, wherein the operations further comprising:
- linking, by at least one data processor, the first displayed image and the second displayed image to represent a data flow.

23. The system of claim 22, wherein the linking comprises specifying a data transform.

24. The system of claim 19, wherein the format of the COBOL copybook is one of a system-specific format and an application-specific format.

25. The system of claim 19, wherein the operations further comprise:
- reading a COBOL statement from the COBOL copybook; and
- processing the COBOL statement upon determining that the COBOL statement is a COBOL data definition.

26. The system of claim 19, wherein the operations further comprise:
- receiving a description of a data file containing the data record.

27. The system of claim 19, wherein the parsing comprises determining that the COBOL copybook contains a nested data record schema, and wherein the creating comprises providing an option to select a type of the standardized data record schema from an expanded data record schema and a collapsed data record schema.

* * * * *